United States Patent
Hori

(10) Patent No.: US 11,726,654 B2
(45) Date of Patent: Aug. 15, 2023

(54) DISPLAY APPARATUS CAPABLE OF DISPLAYING ICON CORRESPONDING TO SHAPE OF HAND-DRAFTED INPUT, DISPLAY METHOD, AND NON-TRANSITORY COMPUTER-EXECUTABLE MEDIUM STORING PROGRAM THEREON

(71) Applicant: Koshiro Hori, Kanagawa (JP)

(72) Inventor: Koshiro Hori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/680,367

(22) Filed: Feb. 25, 2022

(65) Prior Publication Data
US 2022/0300150 A1   Sep. 22, 2022

(30) Foreign Application Priority Data
Mar. 18, 2021  (JP) .................................. 2021-044492

(51) Int. Cl.
*G06F 3/04883* (2022.01)
*G06V 10/20* (2022.01)
*G06V 30/32* (2022.01)

(52) U.S. Cl.
CPC ........ *G06F 3/04883* (2013.01); *G06V 10/255* (2022.01); *G06V 30/32* (2022.01)

(58) Field of Classification Search
CPC .. G06F 3/04883; G06F 40/169; G06F 3/0488; G06F 40/103; G06F 40/171; G06V 30/32; G06V 10/255; G06V 40/107
See application file for complete search history.

(56) References Cited

U.S. PATENT DOCUMENTS

| | | | |
|---|---|---|---|
| 9,256,588 B1 * | 2/2016 | Moscovich | G06F 40/171 |
| 2015/0186346 A1 * | 7/2015 | Mesguich Havilio | G06F 3/0488 715/256 |
| 2015/0220504 A1 * | 8/2015 | Bocanegra Alvarez | G06F 40/169 715/233 |
| 2016/0018968 A1 * | 1/2016 | Wilson | G06F 3/0488 715/763 |
| 2016/0188558 A1 * | 6/2016 | Shikawa | G06F 40/103 715/230 |
| 2020/0089332 A1 * | 3/2020 | Yamazoe | G06V 40/107 |

FOREIGN PATENT DOCUMENTS

| | | |
|---|---|---|
| JP | 2000-348022 | 12/2000 |
| JP | 2018-026117 | 2/2018 |
| KR | 2009032538 A * | 4/2009 |

* cited by examiner

*Primary Examiner* — Richard J Hong
(74) *Attorney, Agent, or Firm* — Xsensus LLP

(57) ABSTRACT

A display apparatus includes a memory and circuitry. The memory that stores one or more display components. The circuitry receives an input of hand drafted input data. The circuitry displays at least one display component of the one or more display components, the at least one display component corresponding to a shape of the hand drafted input data whose input is received.

14 Claims, 16 Drawing Sheets

FIG. 8A
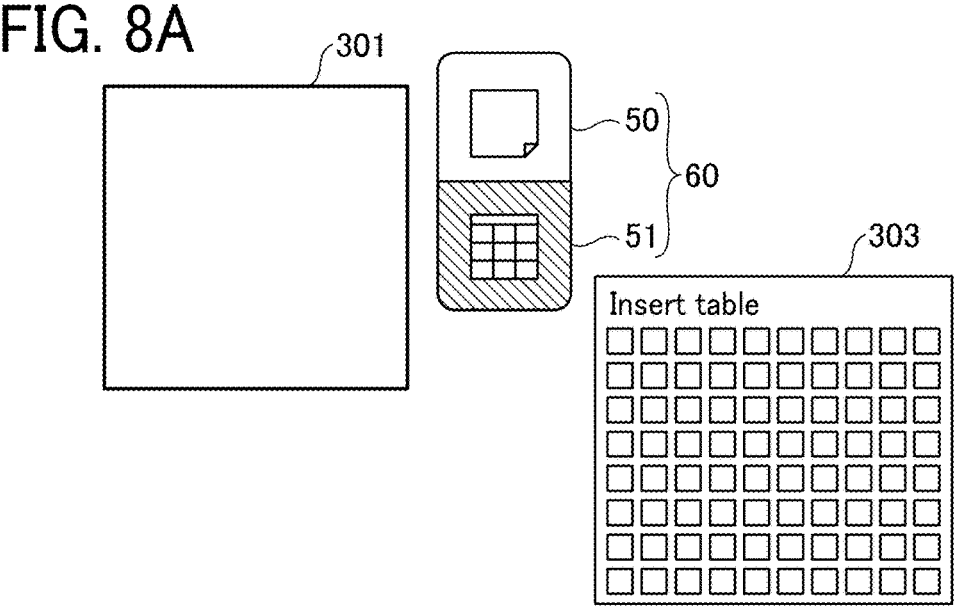
FIG. 8B
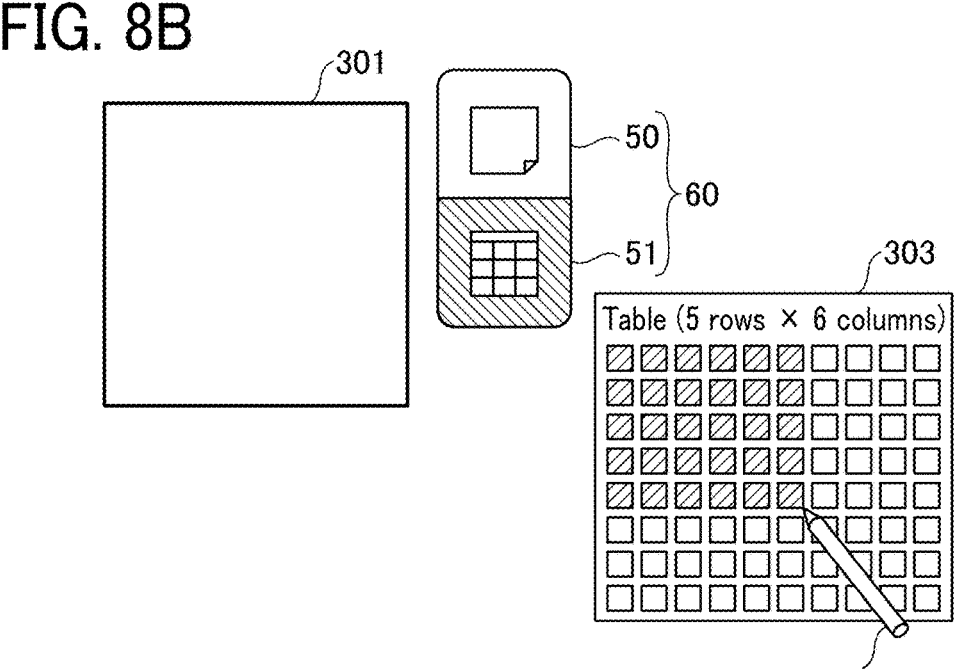
FIG. 8C

DISPLAY APPARATUS CAPABLE OF DISPLAYING ICON CORRESPONDING TO SHAPE OF HAND-DRAFTED INPUT, DISPLAY METHOD, AND NON-TRANSITORY COMPUTER-EXECUTABLE MEDIUM STORING PROGRAM THEREON

CROSS-REFERENCE TO RELATED APPLICATION

This patent application is based on and claims priority pursuant to 35 U.S.C. § 119(a) to Japanese Patent Application No. 2021-044492, filed on Mar. 18, 2021, in the Japan Patent Office, the entire disclosure of which is hereby incorporated by reference herein.

BACKGROUND

Technical Field

Embodiments of the present disclosure relate to a display apparatus, a display method, and a non-transitory computer-executable medium.

Related Art

Display apparatuses are known that convert hand drafted input data to a character string (character codes) and display the character string on a screen by using a handwriting recognition technique. A display apparatus having a relatively large touch panel is used in a conference room and is shared by a plurality of users as an electronic whiteboard, for example.

Such display apparatuses are becoming more sophisticated, and a user sometimes does not know how to operate the display apparatuses. A technology of displaying guidance for guiding an operation procedure is known. For example, an information processing apparatus is known that displays guidance information having appropriate contents according to a user's proficiency level and implements a work environment suitable for each user.

SUMMARY

An embodiment of the present disclosure includes a display apparatus including a memory and circuitry. The memory that stores one or more display components. The circuitry receives an input of hand drafted input data. The circuitry displays at least one display component of the one or more display components, the at least one display component corresponding to a shape of the drafted input data whose input is received.

Another embodiment of the present disclosure includes a display method. The display method includes receiving an input of hand drafted input data. The display method includes acquiring at least one display component corresponding a shape of the hand drafted input data from a memory that stores one or more display components. The display method includes displaying the at least one display component.

Another embodiment of the present disclosure includes a non-transitory computer-executable medium storing a program storing instructions which, when executed by a processor of a display apparatus, causes the display apparatus to perform a method. The method includes receiving an input of hand drafted input data. The method includes acquiring at least one display component corresponding a shape of the hand drafted input data from a memory that stores one or more display components. The method includes displaying the at least one display component.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8A to FIG. 8C are diagrams illustrating how a table is displayed in response to an operation on a table icon displayed based on a figure of a quadrangle, according to an embodiment of the present disclosure;

Figure 1A:
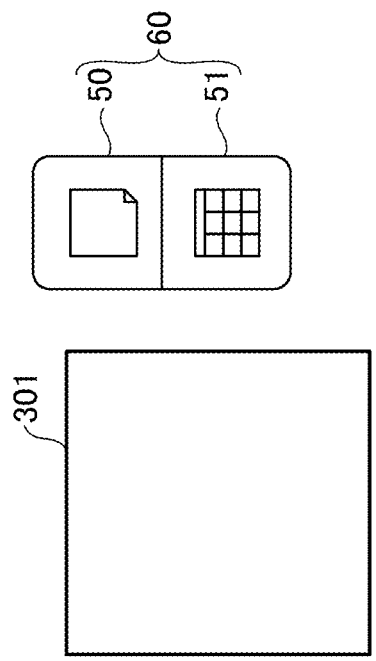
FIG. 1A and FIG. 1B are diagrams illustrating examples of a guidance displayed for a quadrangle, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a display apparatus 2 and a display method performed by the display apparatus 2 according to one or more embodiments of the present disclosure, with reference to the attached drawings.

First Embodiment

Overview of Operation Performed by Display Apparatus:

In a case that a user does not know the operation procedure of the display apparatus 2, the display apparatus 2 displays guidance of the user's desired function in response to selection of a button by the user, for example. However, in a case that a user is not aware that there is a function provided by the display apparatus 2, the user does not even try to display the guidance.

To address such an issue, in the present embodiment, in response to a hand drafted input of a predetermined shape by a user, the display apparatus embodiment displays guidance of a function relating to the shape.

Examples of functions of the display apparatus 2 include, but are not limited to, a figure conversion function, a table function, and a sticky note function.

The figure conversion function is a function with which the display apparatus 2 formats a figure that is hand-drafted on a screen. The term "format" or "formatting" refers to converting a hand-drafted figure into a figure constructed by a straight line or a curved line that is not crooked caused by hand drawing. The figure conversion function is executed in response to turning on the figure conversion function by a user. This is because the user sometimes wants to keep the state of the hand drafted input data unchanged.

The table function is a function with which the display apparatus 2 converts a quadrangle, which is obtained by formatting a hand drafted figure, into a table, in response to a user's operation of adding a horizontal line or vertical line in the square. In addition, the table function accepts a designation of the number of rows and columns to create a table.

The sticky note function is a function with which the display apparatus 2 creates a sticky note in response to a user's operation of adding a line to a quadrangle obtained by formatting a hand drafted figure.

A stamp creation function is a function that allows a user to creating a stamp. The stamp is a type of image (illustration) and is used to express some meaning without using characters.

A ruler function is a function that allows a user to directly hand-draw a straight line that is not crooked due to hand drawing.

Accordingly, in a case that the display apparatus 2 keeps displaying a quadrangle obtained with the figure conversion function, a user may further create a table or a sticky note from the quadrangle. If a user does not read the manual, the user may not be aware that the display apparatus 2 has the table function or the sticky note function.

To address such as issue, the display apparatus 2 according to the present embodiment displays a quadrangle with the figure conversion function, and thereafter displays guidance for informing the user that a table or a sticky note can be created.

FIG. 1A to FIG. 3C are illustrations of display examples of a guidance 60. FIG. 1A illustrates a quadrangle 301 displayed by the display apparatus 2, the quadrangle 301 being obtained with the figure conversion function of formatting a quadrangle drawn by a user by hand.

Figure 1B:
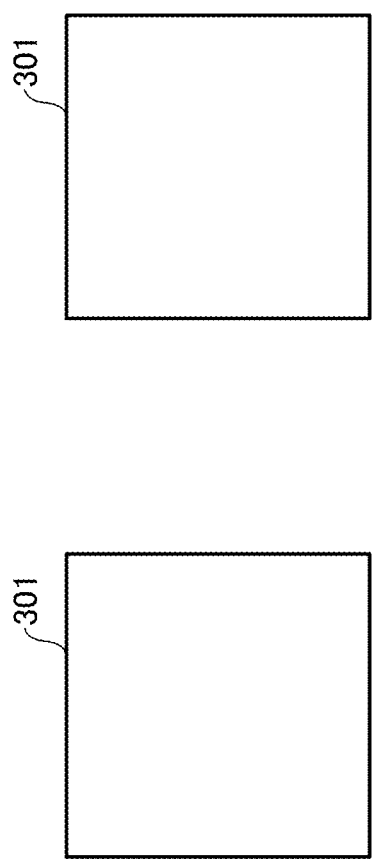

In the state as illustrated in FIG. 1A, when the quadrangle 301 is displayed with the figure conversion function, the display apparatus 2 is in a state capable of creating a table or a sticky note. Accordingly, the display apparatus 2 displays the guidance 60 for informing the presence of the table function and the sticky note function. In FIG. 1B, a table icon 50 indicating the table function and a sticky note icon 51 indicating the sticky note function are displayed, as the guidance 60, to the upper right of the quadrangle 301.

When the user views the table icon 50 and the sticky note icon 51 indicating the sticky note function, the user recognizes that the user can create a table or a sticky note from the figure of the quadrangle 301. First, a case is described in which the user presses the sticky note icon 51.

Figure 2B:
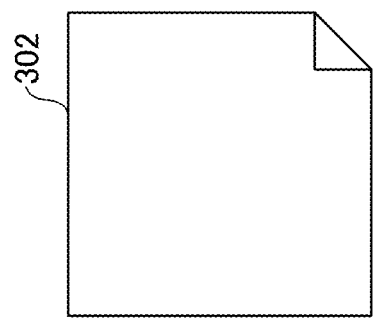
FIG. 2A and FIG. 2B are diagrams illustrating examples of a sticky note displayed in response to pressing of a sticky note icon, according to an embodiment of the present disclosure.
Figure 2A:
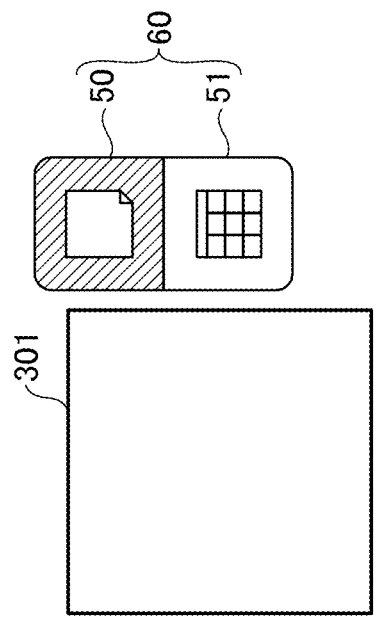

FIG. 2A illustrates a state in which the user presses the sticky note icon 51. In response to the selection (pressing) by the user, the color and/or brightness of the sticky note icon 51 changes, to notify the user that the pressing has been received. The display apparatus 2 converts the quadrangle into a sticky note 302, and displays the sticky note 302.

FIG. 2B is a display example of the sticky note 302. In one example, the size of the sticky note 302 is the same as the size of the quadrangle 301. The color of the sticky note 302 is the same as the color of the sticky note 302 created last. In a case that the user has not created the sticky note 302 in the past, the color of the sticky note 302 is a default color, for example.

The user can write memos or the like on the sticky note 302 by hand. Further, the user can move the sticky note 302 to a desired position.

Next, a case is described in which the user presses the table icon 50.

Figure 3A:
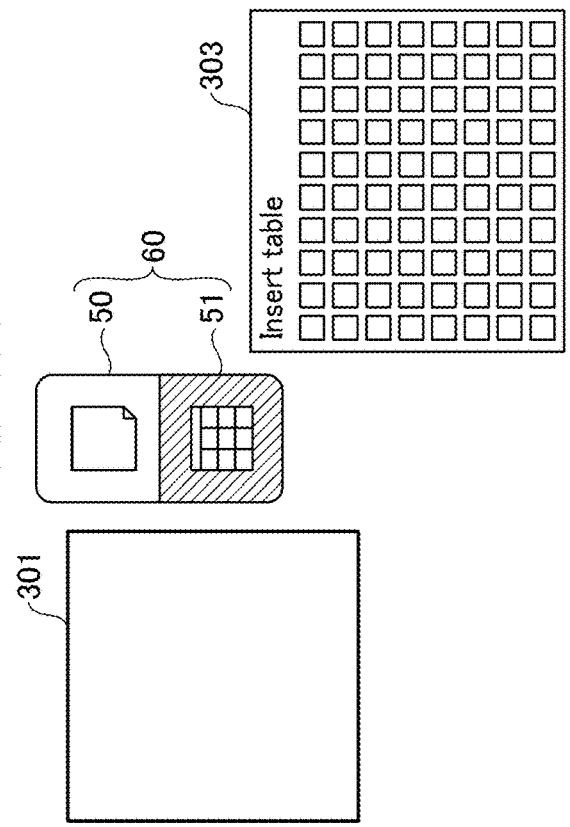
FIG. 3A to FIG. 3C are diagrams illustrating examples of a table displayed in response to pressing of a table icon, according to an embodiment of the present disclosure.

FIG. 3A illustrates a state in which the user presses the table icon 50 illustrated in FIG. 1B.

In response to the selection (pressing) by the user, the color and/or brightness of the table icon 50 changes, to notify the user that the pressing has been received. The display apparatus 2 displays a dialog box 303, that allows the user to designate the number of rows and columns of the table.

Figure 3B:
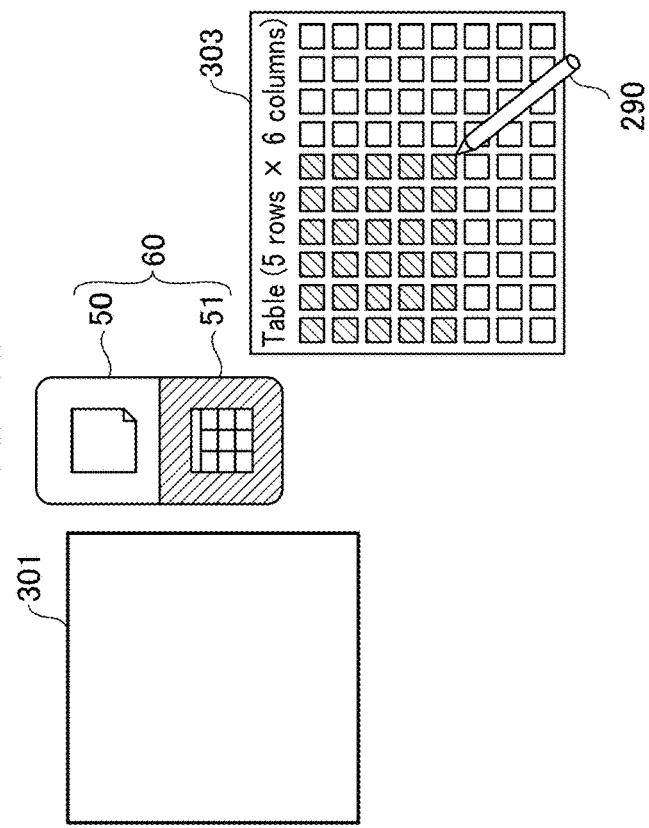
Figure 3C:
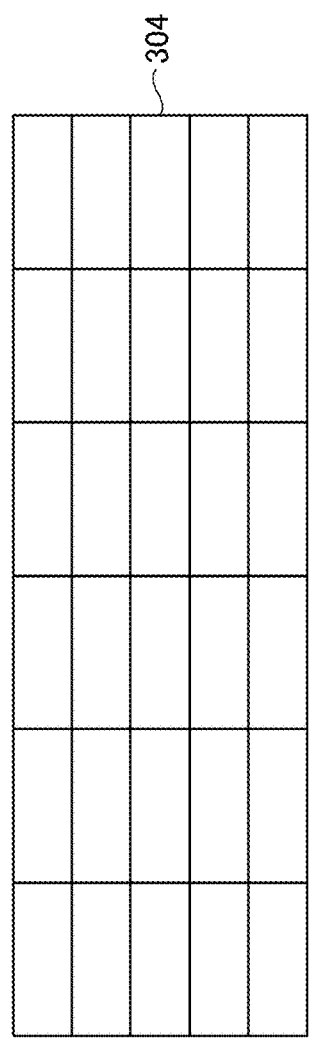

FIG. 3B illustrates an example how the user designates the number of rows and columns of the table. The user designates the number of rows and columns in a manner that the user draws a stroke with an input device such as an electronic pen 290. The user selects a desired cell with the input device. The color of the selected cell changes to, for example, orange. The user slides the input device with the input device being pressed against a display, to select desired rows and columns. When the user releases the input device from the display, the number of rows and columns of the table is fixed. The display apparatus 2 deletes the quadrangle 301 and displays the table 304. FIG. 3C illustrates the table 304 thus displayed.

As described above, when a user draws a predetermined shape by hand as hand drafted input data (more specifically, when the display apparatus 2 converts the hand drafted input data into a certain figure with the figure conversion function), the display apparatus 2 according to the present embodiment displays the guidance 60 of functions relating to the shape of the hand drafted input data. This allows the user to use a desired function, even in a case that there is a function that the user is unaware of. Further, when a user uses a new function, the time and efforts are saved for the user to search or check a manual for the new function.

Terms

"Input device" may be any means with which a user inputs handwriting (hand drafting) by designating coordinates on a touch panel. Examples of the input device include, but are not limited to, a pen, a human finger, a human hand, and a bar-shaped member.

A series of user operations including engaging a writing mode, recording movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse. "Stroke data" is data based on a trajectory of coordinates of a stroke input with the input device, and the coordinates may be interpolated appropriately. "Hand drafted input data" is data having one or more stroke data. "Hand drafted input data" is data used for displaying (reproducing) a display screen including objects hand-drafted by the user. "Hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user.

An "object" refers to an item displayed on a screen and includes an object drawn by a stroke. The term "object" in this specification also represents an object of display. A character string obtained by handwritten text recognition and conversion may include, in addition to text data, data displayed based on a user operation, such as a stamp of a given character or mark such as "complete," a figure such as a circle or a star, or a straight line.

A character string is one or more character codes (fonts) converted from hand drafted input data by character recognition. The character string may be one or more characters handled by a computer. The characters include numbers, alphabets, and symbols, for example. The character string is also referred to as text data.

The guidance 60 refers to an introductory explanation. The guidance is sometimes referred to as a help function. In the present embodiment, an icon corresponding to the shape of hand drafted input data is displayed as an example of the guidance 60. Displaying the guidance in the form of an icon allows the user to recognize which function is provided at a glance. In another example, the guidance 60 is provided in the form of text or voice indicating the corresponding function.

The "display component" refers to one of display elements of a screen. The display component causes, when selected according to a user's operation directly or indirectly, a processor to execute predetermined processing.

In the present embodiment, the icon is the display component. Other examples of the display component include, but are not limited to, characters, a check box, a text entry, and a button, indicating an operation. The display component may be an object to be pressed when the user uses the input device. In this case, predetermined processing is executed in response to pressing the user's pressing of the display component.

The "function relating to the shape of hand drafted input data" refers to a function that can be used by a user for the shape of hand drafted data.

Figure 4A:
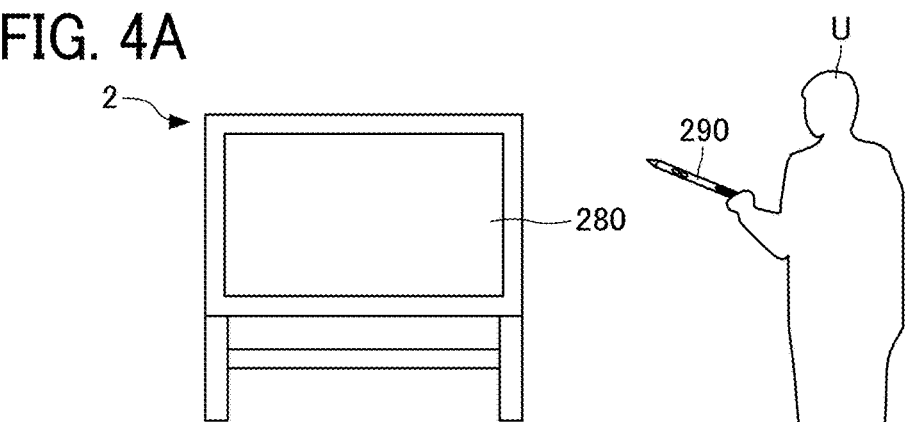
FIG. 4A to FIG. 4C are diagrams illustrating examples of a general arrangement of a display apparatus, according to an embodiment of the present disclosure.
Figure 4B:
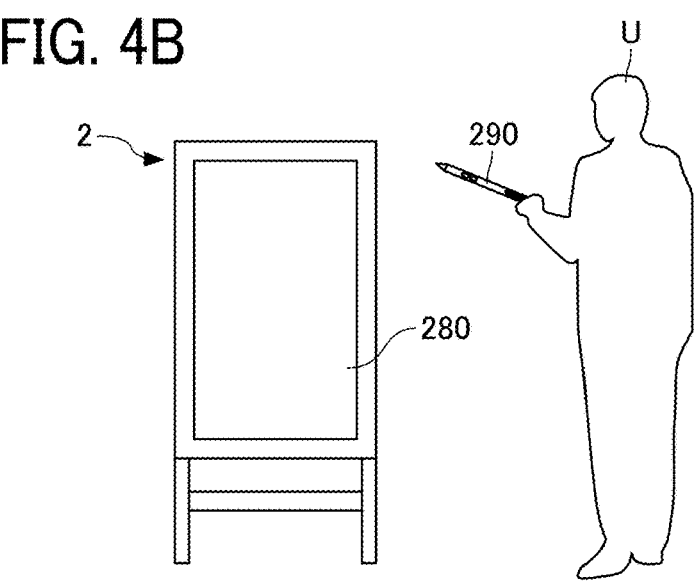
Figure 4C:
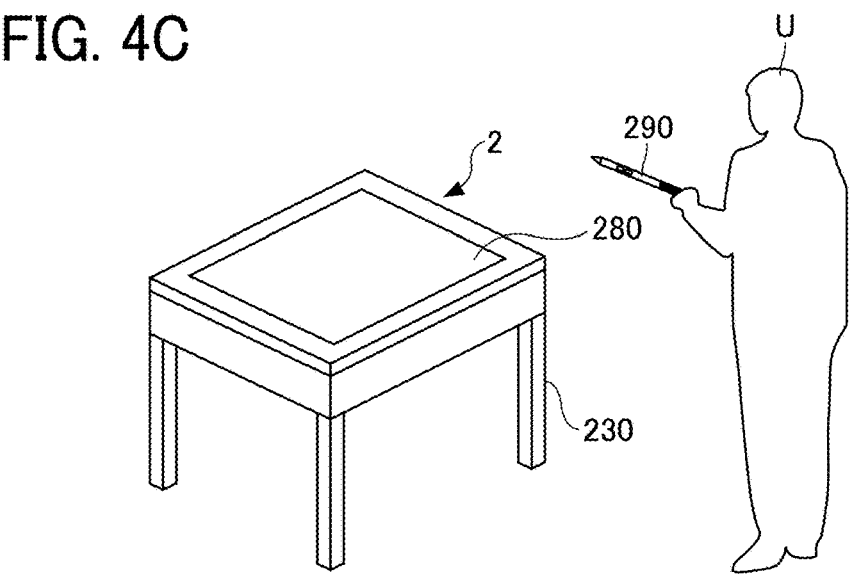

Configuration of Apparatus:

Referring to FIG. 4A to FIG. 4C, a general arrangement of the display apparatus 2 is described according to the present embodiment. FIG. 4A to FIG. 4C are diagrams each illustrating an example of an overall configuration of the display apparatus 2. FIG. 4A illustrates, as an example of the display apparatus 2, the display apparatus 2 used as an electronic whiteboard having a landscape rectangular shape as being is placed on its side.

As illustrated in FIG. 4A, a display 280 as an example of a display apparatus 2 is provided on the upper part of the display apparatus 2. A user U hand-drafts (inputs or draws), for example, a character on the display 280 using the input device.

FIG. 4B illustrates the display apparatus 2 used as an electronic whiteboard having a portrait rectangular shape as being is placed vertically.

FIG. 4C illustrates, as another example, the display apparatus 2 placed on the top of a desk 230. Since the display apparatus 2 is thin, the height of the desk 230 does not need to be adjusted, which is a general-purpose desk, when the display apparatus is placed on the top of the desk. Further, the display apparatus 2 is portable and easily moved by the user.

Examples of how to input coordinates by touching with the input device include, but are not limited to, an electromagnetic induction method and an active capacitive coupling method. In another example, the electronic pen 290 further has functions such as pen pressure detection, inclination detection, or a hover function (displaying a cursor before the pen is brought into contact).

Figure 5:
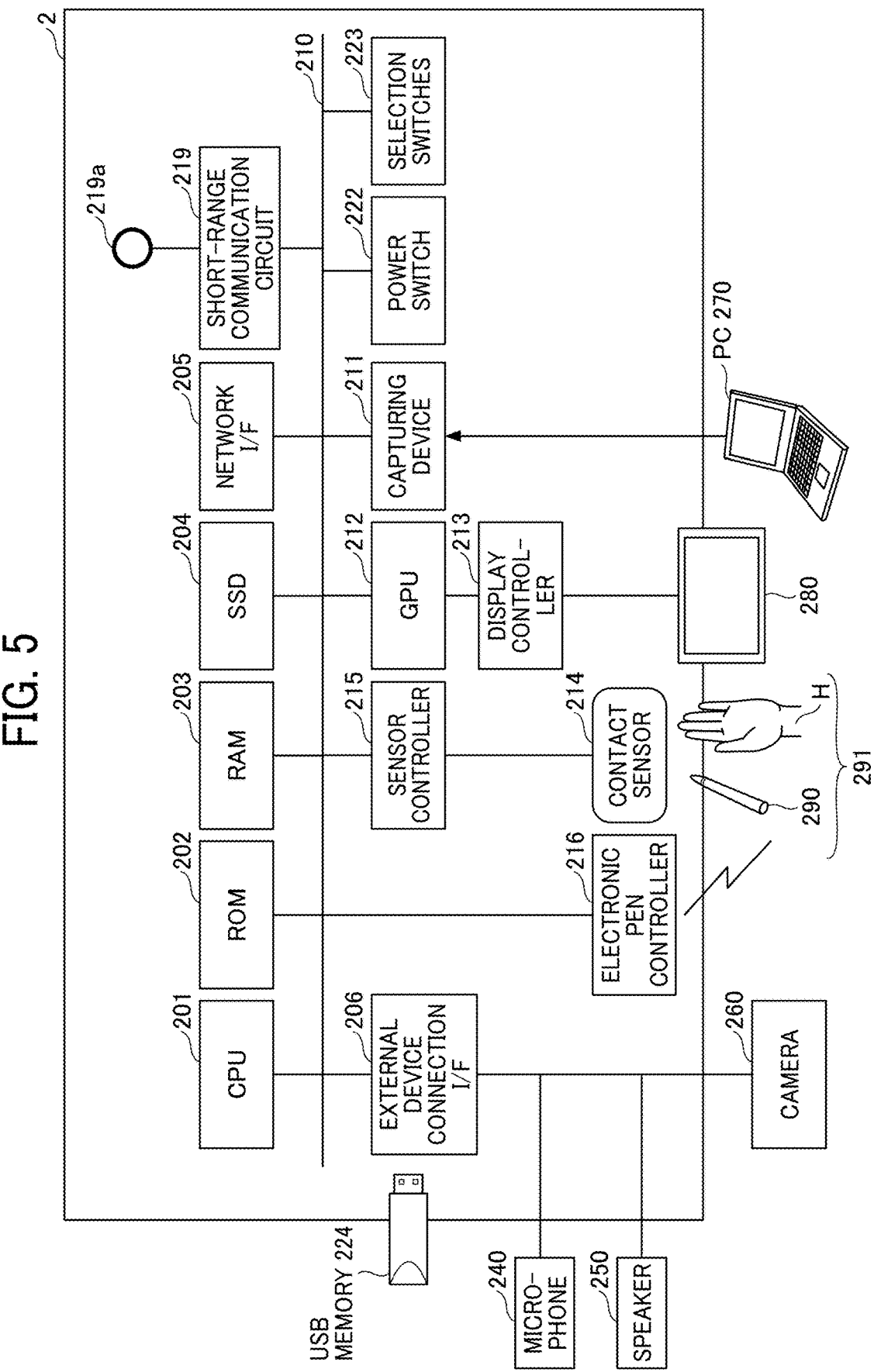
FIG. 5 is a block diagram illustrating an example of a hardware configuration of a display apparatus, according to an embodiment of the present disclosure.

Hardware Configuration:

Referring to FIG. 5, an example of a hardware configuration of the display apparatus 2 is described according to the present embodiment. The display apparatus 2 has a configuration of an information processing apparatus or a computer, as illustrated in FIG. 5. FIG. 5 is a block diagram illustrating an example of a hardware configuration of the display apparatus 2. As illustrated in FIG. 5, the display apparatus 2 includes a central processing unit (CPU) 201, a read only memory (ROM) 202, a random access memory (RAM) 203, a solid state drive (SSD) 204, a network interface (I/F) 205, and an external device connection I/F 206.

The CPU 201 controls overall operation of the display apparatus 2. The ROM 202 stores a control program such as an initial program loader (IPL) to boot the CPU 201. The RAM 203 is used as a work area for the CPU 201.

The SSD 204 stores various data such as a control program for the display apparatus 2. This program may be an application program that runs on an information processing apparatus installed with a general-purpose operating system (OS) such as Windows®, Mac OS®, Android®, and iOS®.

The network I/F 205 controls communication with an external device through a communication network. The external device connection I/F 206 is an interface that connects the display apparatus 2 to various extraneous sources. Examples of the extraneous sources include, but are not limited to, a universal serial bus (USB) memory 224 and external devices (a microphone 240, a speaker 250, and a camera 260).

The display apparatus 2 further includes a capturing device 211, a graphics processing unit (GPU) 212, a display controller 213, a contact sensor 214, a sensor controller 215, an electronic pen controller 216, a short-range communication circuit 219, an antenna 219*a* of the short-range communication circuit 219, a power switch 222, and selection switches 223.

The capturing device 211 causes a display of an external personal computer (PC) 270 to display a still image or a moving image based on image data captured by the capturing device. The GPU 212 is a semiconductor chip dedicated to processing of a graphical image.

The display controller 213 controls display of an image output from the GPU 212 to the display 280.

The contact sensor 214 detects a touch of the electronic pen 290 or the user's hand H onto the display 280. The electronic pen 290 and the user's hand H may be collectively referred to as an input device 291, when they are not distinguished from each other.

The sensor controller 215 controls processing performed by the contact sensor 214. The contact sensor 214 inputs and senses a coordinate by an infrared blocking system. More specifically, the display 280 is provided with two light receiving elements disposed on both upper side ends of the display 280, and a reflector frame surrounding the sides of the display 280. The light receiving elements emit a plurality of infrared rays in parallel to a surface of the display 280. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the two light receiving elements, to the sensor controller 215. Based on the ID of the infrared ray, the sensor controller 215 detects particular coordinates that are touched by the object.

The electronic pen controller 216 communicates with the electronic pen 290 to detect a touch of the tip or bottom of the electronic pen on the display 280.

The short-range communication circuit 219 is a communication circuit that communicates in compliance with the near field communication (NFC) or the Bluetooth®, for example.

The power switch 222 turns on or off the power of the display apparatus 2.

The selection switches 223 are a group of switches for adjusting brightness, hue, etc., of display on the display 280, for example.

The display apparatus 2 further includes a bus line 210. The bus line 210 is an address bus, a data bus, or the like, which electrically connects the elements in FIG. 5 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 290, the electronic pen controller 216 may also detect a touch by another part of the electronic pen 290 on the display 280, such as a part of the electronic pen 290 held by a hand of the user.

Figure 6:
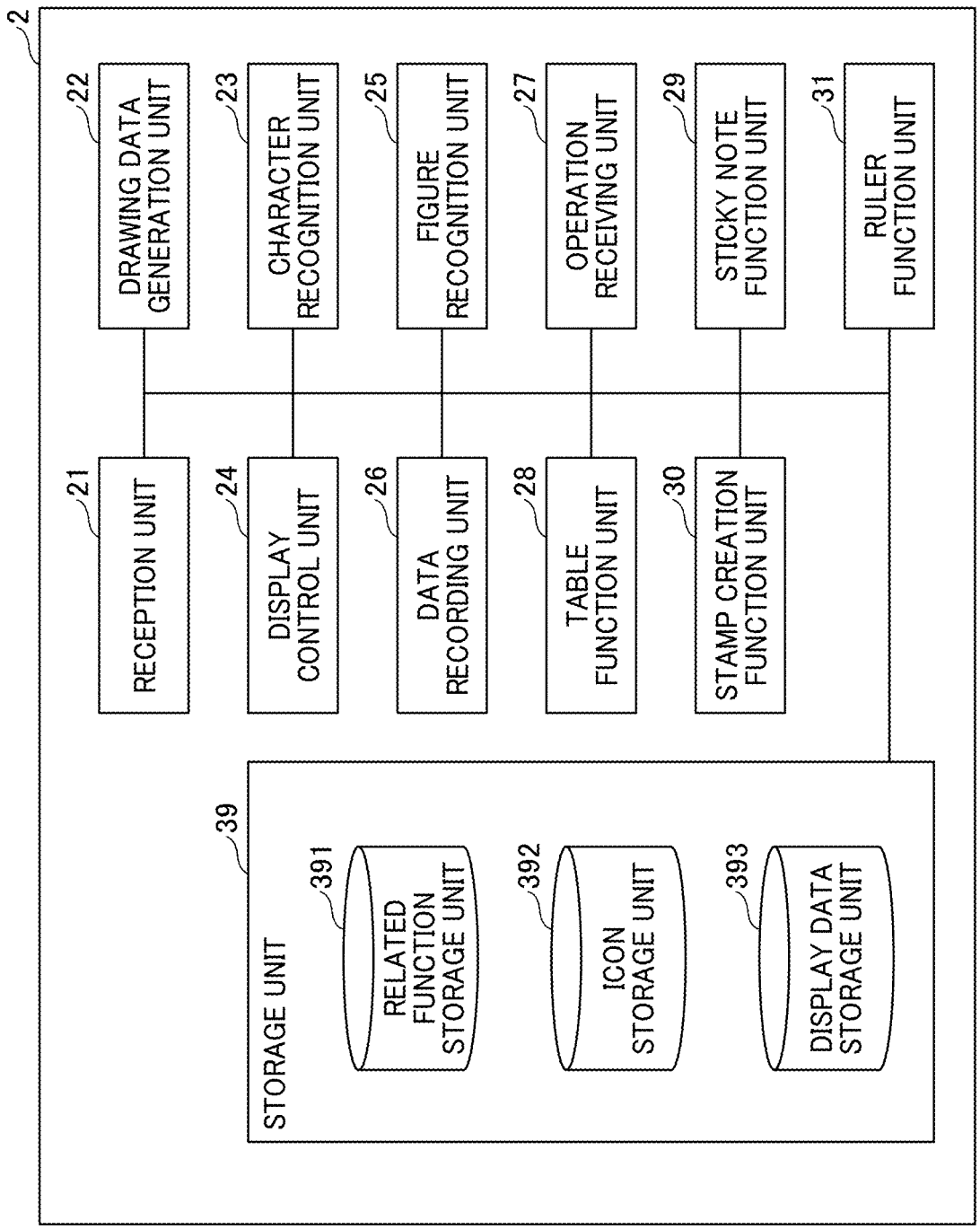
FIG. 6 is a block diagram illustrating an example of a functional configuration of a display apparatus, according to an embodiment of the present disclosure.

Functions:

Referring to FIG. 6, a functional configuration of the display apparatus 2 is described according to the present embodiment. FIG. 6 is a block diagram illustrating an example of a functional configuration of the display apparatus 2 according to the present embodiment. The display apparatus 2 includes a reception unit 21, a drawing data generation unit 22, a character recognition unit 23, a display control unit 24, a figure recognition unit 25, a data recording unit 26, an operation receiving unit 27, a table function unit 28, a sticky note function unit 29, a stamp creation function unit 30, and a ruler function unit 31. These functional units of the display apparatus 2 are implemented by or are caused to function by operation of any of the elements illustrated in FIG. 5 according to an instruction from the CPU 201 according to a program loaded from the SSD 204 to the RAM 203.

The reception unit 21 is implemented by the contact sensor 214 and detects coordinates of a position touched by the input device 291. The drawing data generation unit 22 acquires the coordinates of the position touched by the tip of the input device 291 from the reception unit 21. The drawing data generation unit 22 connects a plurality of contact coordinates into a coordinate point sequence by interpolation, to generate stroke data.

The display control unit 24 displays, on a display, hand drafted input data, a graphic, a character string converted from the hand drafted input data, and an operation menu to be operated by the user.

The character recognition unit 23 performs character recognition processing on one or more pieces of stroke data (hand drafted input data), namely the stroke data corresponding to one or more strokes, drafted by the user and converts the stroke data into character codes. The character recognition unit 23 reads characters (of multilingual languages such as English as well as Japanese), numbers, symbols (e.g., %, $, and &), graphics (e.g., lines, circles, and triangles) concurrently with an operation using the input device 291 by the user. Although various algorithms have been proposed for the recognition method, a detailed description is omitted on the assumption that known techniques can be used in the present embodiment.

The figure recognition unit 25 performs figure recognition on hand drafted stroke data that is input by a user and converts the stroke data into a figure (e.g., a line, circle, triangle, and quadrangle). Although various algorithms have been proposed for the recognition method, a detailed description is omitted on the assumption that known techniques can be used in the present embodiment.

The data recording unit 26 stores hand drafted input data that is input on the display apparatus 2, a character string converted from the hand drafted input data, and figure data in a display data storage unit 393 in a storage unit 39. A detailed description is given later of the display data.

The operation receiving unit 27 receives an operation to the menu to be operated by a user, which is displayed on the display by the display control unit 24, based on the coordinates of the position touched by the input device 291 received by the reception unit 21.

When a user draws stroke data vertically or horizontally by hand drafted input in the quadrangle 301 converted as a figure, the table function unit 28 receives such the user operation as an instruction for creating a table.

When a setting for displaying related function icons is set to ON, the figure recognition unit 25 converts the stroke data into the quadrangle 301, and the display control unit 24 displays the table icon. A detailed description is given later of the setting for displaying related function icon. The table function unit 28 creates a table in response to pressing of the table icon.

The sticky note function unit 29 creates a sticky note. When the setting for displaying related function icons is set to ON, the figure recognition unit 25 converts the stroke data into the quadrangle 301, and the display control unit 24 displays the sticky note icon. The sticky note function unit 29 creates a sticky note in response to pressing of the sticky note icon.

The stamp creation function unit 30 creates a stamp. When the setting for displaying related function icons is set to ON, the figure recognition unit 25 converts the stroke data into a circle, and the display control unit 24 displays a stamp icon. The stamp creation function unit 30 creates a stamp in response to pressing of the stamp icon.

The ruler function unit 31 creates a ruler. When the setting for displaying related function icons is set to ON, the figure recognition unit 25 converts stroke data into a straight line, and the display control unit 24 displays a ruler icon. The ruler function unit 31 creates a ruler in response to pressing of the ruler icon.

TABLE 1

| FIGURE | RELATED FUNCTION 1 | RELATED FUNCTION 2 |
|---|---|---|
| Quadrangle | Sticky note | Table |
| Straight line | Ruler | Null |
| Circle | Stamp creation | Null |
| . . . | . . . | . . . |

Table 1 schematically represents related function information stored in a related function storage unit 391 that the storage unit 39 includes. The related function storage unit 391 stores related functions, which are functions relating to types of figures. When the figure recognition unit 25 converts stroke data into a certain figure, the display control unit 24 displays the guidance 60 of a function associated with the certain graphic in Table 1.

The association table, such as Table 1, in any one of the embodiments of the present disclosure may be generated by machine learning. In another example, by classifying the types of figure input by hand drafting by a user and the related function selected by the user by machine learning, the association table may be omitted.

In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

TABLE 2

| RELATED FUNCTION | ICON IMAGE |
|---|---|
| Sticky note | Stick note icon.png |
| Table | Table icon.png |
| Ruler | Ruler icon.png |
| Stamp creation | Stamp creation icon.png |
| . . . | . . . |

Table 2 schematically represents icon information stored in an icon storage unit 392 that the storage unit 39 includes. The icon storage unit 392 stores icon images corresponding to the related functions. When displaying the guidance 60 of the related functions, the display control unit 24 displays the icon images indicated in Table 2.

TABLE 3

| STROKE ID | FIGURE |
|---|---|
| s001 | Quadrangle |
| . . . | . . . |

Table 3 schematically represents display data stored in the display data storage unit 393 that the storage unit 39 includes. The display data storage unit 393 stores hand drafted input data that is input on the display apparatus 2, a converted character string, an image (a screen captured from the PC), a file, for example. Table 3 represents an example in which only stroke data is stored. When the stroke data is converted into a figure, the type of the figure is stored. Stroke data and original data of the figure (e.g., a coordinate point sequence, position of the figure, color, and thickness) are further recorded, in addition to the stroke data and the type of the figure.

Display Example of Guidance:

A description is now given of display examples of the guidance 60 of some functions.

Guidance of Sticky Note Function:

FIG. 7A to FIG. 7E illustrates how a sticky note is displayed in response to an operation on the sticky note icon 51 displayed based on the figure of the quadrangle 301. In order to clarify the correspondence with processes in the flowcharts of FIG. 11A, and FIG. 11B (FIGS. 11BA and 11BB) described below, step numbers of the flowcharts are referred to.

Figure 7A:
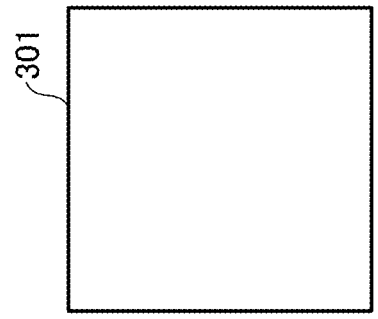
FIG. 7A to FIG. 7E are diagrams illustrating how a sticky note is displayed in response to an operation on a sticky note icon displayed based on a figure of a quadrangle, according to an embodiment of the present disclosure.
Figure 11A:
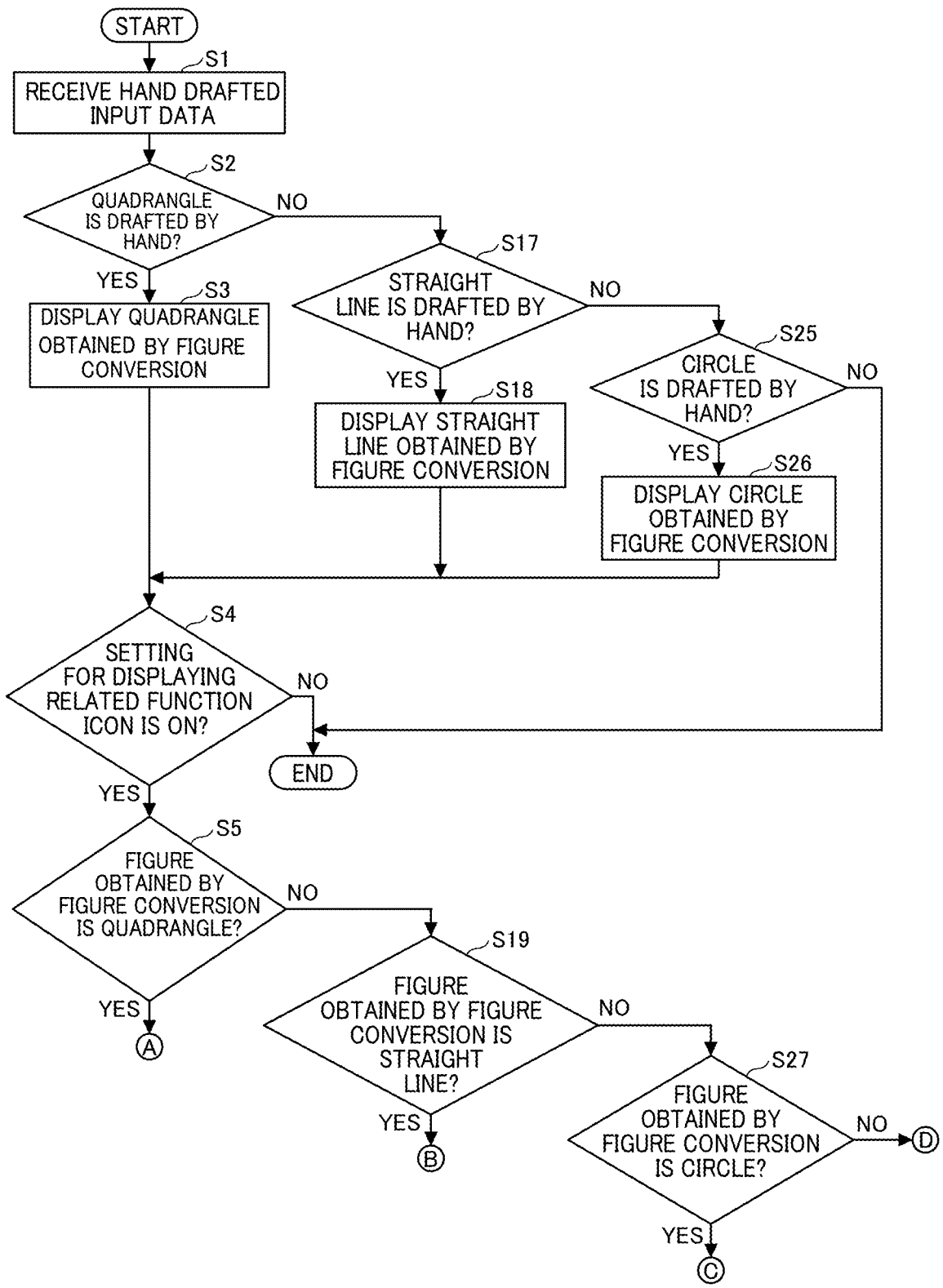
FIG. 11A is flowchart illustrating an example of operation, performed by a display apparatus, of displaying a guidance of a function corresponding to a shape of hand drafted input data drafted by a use, according to an embodiment of the present disclosure.

FIG. 7A illustrates an example of hand drafted data input by a user (FIG. 11A: step S1). In the example of FIG. 7A, the user hand-drafts a quadrangle 300. As indicated in Table 3, a stroke ID is stored in the display data storage unit 393.

Figure 7B:
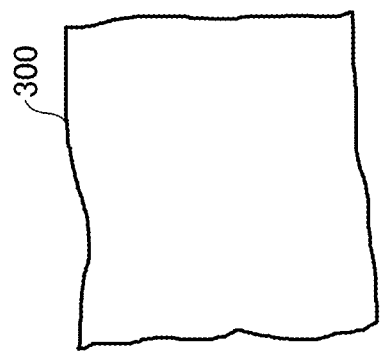

FIG. 7B illustrates an example of the quadrangle 301 converted from the hand drafted input data by the figure recognition unit 25 (FIG. 11A: step S2 and step S3). In the display data storage unit 393, a figure is stored in association with the stroke ID, as indicated in Table 3.

Figure 7C:
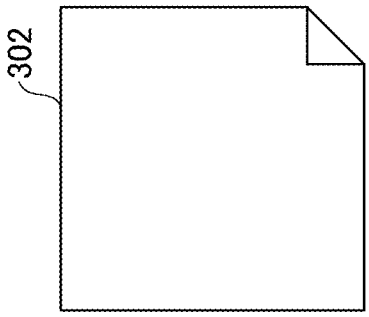
Figure 11B:
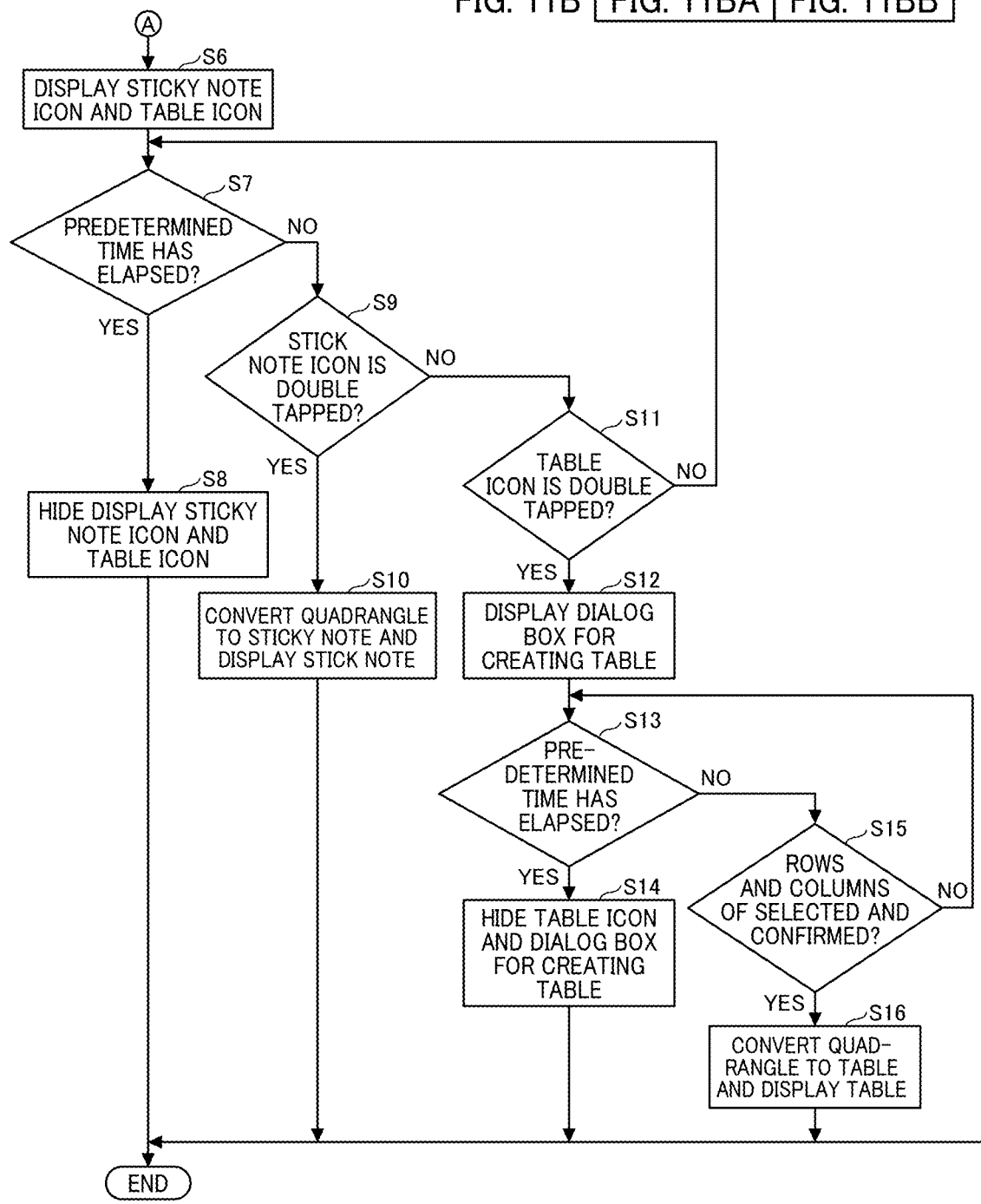
FIG. 11BA and FIG. 11BB (FIG. 11B) are flowcharts illustrating an example of operation, performed by a display apparatus, of displaying a guidance of a function corresponding to a shape of hand drafted input data drafted by a use, according to an embodiment of the present disclosure.

FIG. 7C illustrates the sticky note icon 51 and the table icon 50 (at least one of the sticky note icon and the table icon is displayed), which are displayed when the figure is the quadrangle 301 in a case that the setting for displaying related function icons is set to ON. The display control unit 24 acquires the sticky note function and the table function associated with the figure of the quadrangle 301 as the display data from the related function information, e.g., Table 1, stored in the related function storage unit 391. The display control unit 24 acquires the icon images associated with the sticky note function and the table function from the icon information, e.g., Table 2, stored in the icon storage unit 392. The display control unit 24 displays the sticky note icon 51 and the table icon 50 as buttons to the upper right of the quadrangle 301 (FIG. 11A: step S4 and step S5; FIG. 11BA: step S6). In another example, the sticky note icon 51 and the table icon 50 are displayed in any other position provided that the icons are displayed near the quadrangle 301. When a user views the displayed sticky note icon 51 and table icon 50, the user recognizes that the user can use the sticky note function or the table function from the quadrangle 301.

Figure 7D:
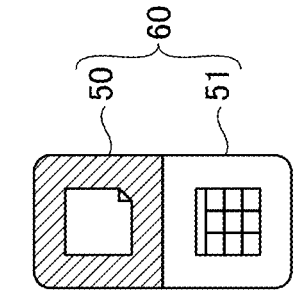

FIG. 7D illustrates a state in which the sticky note icon 51 is selected in response to the user's pressing of the sticky note icon 51 before the lapse of a certain time period (FIG. 11BA: step S7 and step S9). The display control unit 24 changes the color and/or brightness of the sticky note icon 51 to notify the user of the selection of the sticky note icon 51. When the certain time period has elapsed, the sticky note icon 51 and the table icon 50 are hidden as illustrated in FIG. 7B (FIG. 11BA: step S8).

Figure 7E:
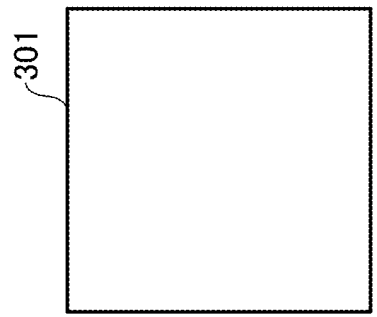

FIG. 7E illustrates an example of the sticky note 302 displayed in response to pressing of the sticky note icon 51. The operation receiving unit 27 receives the pressing of the sticky note icon 51. The sticky note function unit 29 converts the quadrangle 301 to the sticky note 302. The display control unit 24 displays the sticky note 302 (FIG. 11BA: step S10).

Guidance of Table Function:

FIG. 8A to FIG. 8C illustrates how a table is displayed in response to an operation on the table icon 50 displayed based on the figure of the quadrangle 301. The processes described above with reference to FIG. 7A to FIG. 7C have already been performed.

FIG. 8A illustrates a state in which the table icon 50 is selected in response to the user's pressing of the table icon 50 before the lapse of the certain time period (FIG. 11BA: step S7 and step S11). The operation receiving unit 27 receives the pressing of the table icon 50. The table function unit 28 creates a dialog box 303 for creating a table. The display control unit 24 displays the dialog box 303 (FIG. 11BA: step S12).

FIG. 8B illustrates the dialog box 303 for creating a table, the dialog box 303 being in a state in which the user designates rows and columns (FIG. 11BA: step S15). The operation receiving unit 27 detects a range of rows and columns according to the coordinates of the input device 291 detected by the reception unit 21. The display control unit 24 changes the color of the range to display the range as a selected range.

FIG. 8C illustrates an example of a table created by the table function unit 28.

In response to detection of release of the input device 291 from the display after the user's operation for designating rows and column of the table to be created, the operation receiving unit 27 accepts the rows and columns.

The table function unit 28 converts the quadrangle 301 to the table 304 having the designated rows and columns. The display control unit 24 displays the table 304 thus converted (FIG. 11BA: step S16).

The user can input hand drafted data in each cell of the table 304. The hand drafted input data is stored in association with the cell. The table function unit 28 performs various operations on the hand drafted input data by a row by row basis, by a column by column basis, or a cell by cell basis. Examples of the operations on the hand drafted input data include, but are not limited to, copying, moving, and deleting. Character recognition may be performed on the hand drafted input data. Further, the table function unit 28 is configured to perform general-purpose processing that can be performed by spreadsheet software, such as calculation of totals for each row and each column.

Guidance of Ruler Function:

Referring to FIG. 9A to 9E, Table 1, Table 2, and Table 4, a ruler icon 52 is described, which is displayed when hand drafted input data is converted into a straight line by the figure recognition unit 25.

Figure 9A:
FIG. 9A to FIG. 9E are diagrams illustrating how a ruler is displayed in response to an operation on a ruler icon displayed based on a figure of a straight line, according to an embodiment of the present disclosure.

FIG. 9A illustrates an example of hand drafted input data of a straight line 310 input by a user (FIG. 11A: step S1). Accordingly, a stroke ID (s010) is stored in the display data storage unit 393 (Table 4).

Figure 9B:

FIG. 9B illustrates an example of a straight line 311 converted from the hand drafted input data by the figure recognition unit 25 (FIG. 11A: step S17 and step S18).

Accordingly, the straight line is stored in association with the stroke ID (s010) in the display data storage unit 393.

TABLE 4

| STROKE ID | FIGURE |
|---|---|
| ... | ... |
| s010 | Straight line |
| ... | ... |

Table 4 schematically represents display data stored in the display data storage unit 393 that the storage unit 39 includes. In Table 4, the stroke data and the straight line are associated, for the purpose of description of the ruler function.

Figure 9C:
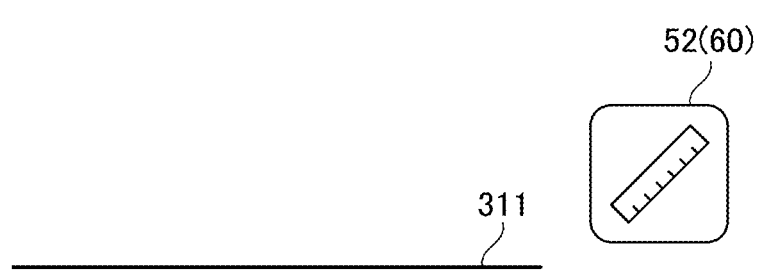

FIG. 9C illustrates the ruler icon 52, which is displayed when the figure is the straight line 311 in a case that the setting for displaying related function icons is set to ON. The display control unit 24 acquires the ruler function associated with the figure of the straight line as the display data from the related function information, e.g., Table 1, stored in the related function storage unit 391. The display control unit 24 acquires the icon image associated with the ruler function from the icon information, e.g., Table 2, stored in the icon storage unit 392. The display control unit 24 displays the ruler icon 52 as a button to the upper right of the straight line 311 (FIG. 11A: step S4 and step S19; FIG. 11BB: step S20). In another example, the ruler icon 52 is displayed in any other position provided that the ruler icon is displayed near the straight line 311. When a user views the displayed ruler icon 52, the user recognizes that the user can use the ruler function from the straight line 311.

Figure 9D:
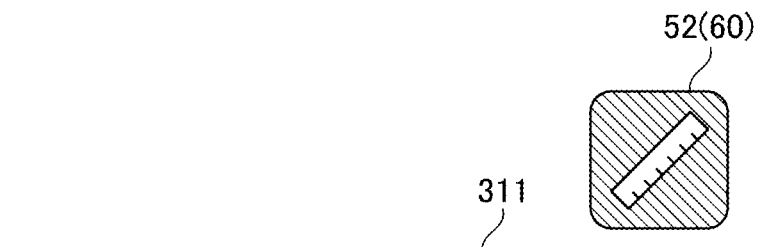

FIG. 9D illustrates a state in which the ruler icon 52 is selected in response to the user's pressing of the ruler icon before the lapse of a certain time period (FIG. 11BB: step S21 and step S23). The display control unit 24 changes the color and/or brightness of the ruler icon 52 to notify the user of the selection of the ruler icon. When the certain time period has elapsed, the ruler icon 52 is hidden as illustrated in FIG. 9B (FIG. 11BB: step S22).

Figure 9E:
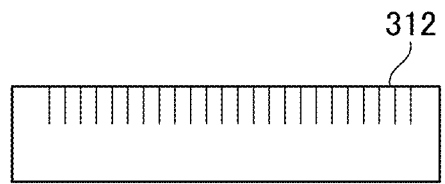

FIG. 9E illustrates a ruler 312 displayed in response to pressing of the ruler icon 52.

The operation receiving unit 27 receives the pressing of the ruler icon 52. The ruler function unit 31 converts the straight line 311 to the ruler 312. The display control unit 24 displays the ruler 312 as illustrated in FIG. 9E (FIG. 11BB: step S24).

The ruler function is a function with which a line that is hand-drafted by a user along the ruler is formatted to a straight line. Thus, the ruler function enables a user to directly hand draft a straight at a desired place without performing an operation for converting hand drafted input data into a straight line.

Guidance of Stamp Creation Function:

Referring to FIG. 10A to 10F, Table 1, Table 2, and Table 5, a stamp icon 53 is described, which is displayed when hand drafted input data is converted into a circle by the figure recognition unit 25.

Figure 10A:
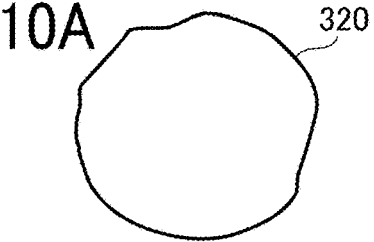
FIG. 10A to FIG. 10F are diagrams illustrating how a stamp is displayed in response to an operation on a stamp icon displayed based on a figure of a circle, according to an embodiment of the present disclosure.

FIG. 10A illustrates an example of hand drafted input data of a circle 320 input by a user (FIG. 11A: step S1). Accordingly, a stroke ID (s100) is stored in the display data storage unit 393 (Table 5).

Figure 10B:
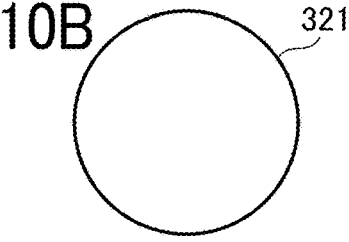

FIG. 10B illustrates an example of a circle 321 converted from the hand drafted input data by the figure recognition unit 25 (FIG. 11A: step S25 and step S26). Accordingly, the circle is stored in association with the stroke ID (s100) in the display data storage unit 393.

TABLE 5

| STROKE ID | FIGURE |
|---|---|
| ... | ... |
| S100 | Circle |
| ... | ... |

Table 5 schematically represents display data stored in the display data storage unit 393 that the storage unit 39 includes. In Table 5, the stroke data and the circle are associated, for the purpose of description of the stamp creation function.

Figure 10C:
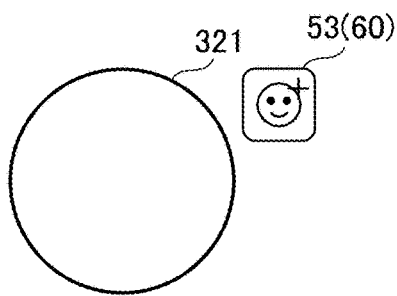

FIG. 10C illustrates the stamp icon 53, which is displayed when the figure is the circle 321 in a case that the setting for displaying related function icon is set to ON. The display control unit 24 acquires the stamp creation function associated with the figure of the circle as the display data from the related function information, e.g., Table 1, stored in the related function storage unit 391. The display control unit 24 acquires the icon image associated with the stamp creation function from the icon information, e.g., Table 2, stored in the icon storage unit 392. The display control unit 24 displays the stamp icon 53 to the upper right of the circle 321 (FIG. 11A: step S4 and step S27; FIG. 11BB: step S28). In another example, the stamp icon 53 is displayed in any other position provided that the stamp icon is displayed near the circle 321. When a user views the displayed stamp icon 53, the user recognizes that the user can use the stamp creation function from the circle 321.

Figure 10D:
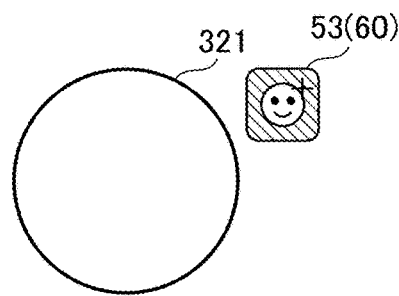

FIG. 10D illustrates a state in which the stamp icon 53 is selected in response to the user's pressing of the stamp icon before the lapse of a certain time period (FIG. 11BB: step S29 and step S31). The display control unit 24 changes the color and/or brightness of the stamp icon 53 to notify the user of the selection of the stamp icon. When the certain time period has elapsed, the stamp icon 53 is hidden as illustrated in FIG. 10B (FIG. 11BB: step S30).

Figure 10E:
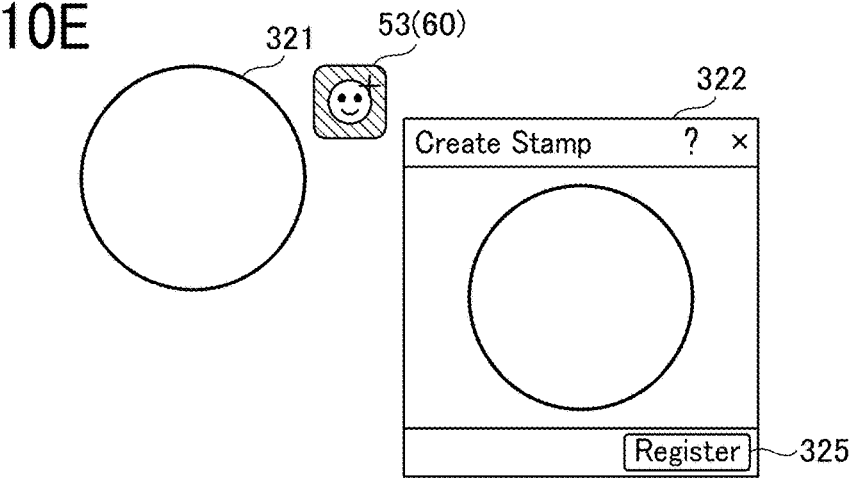

FIG. 10E illustrates a stamp creation screen 322 displayed in response to pressing of the stamp icon 53. The operation receiving unit 27 receives the pressing of the stamp icon 53. The stamp creation function unit 30 displays a stamp creation screen 322. The display control unit 24 displays the stamp creation screen 322 to the upper right of the circle 321 (FIG. 11BB: step S32). In another example, the stamp creation screen 322 is displayed in any other position provided that the stamp creation screen is displayed near the circle 321.

Figure 10F:
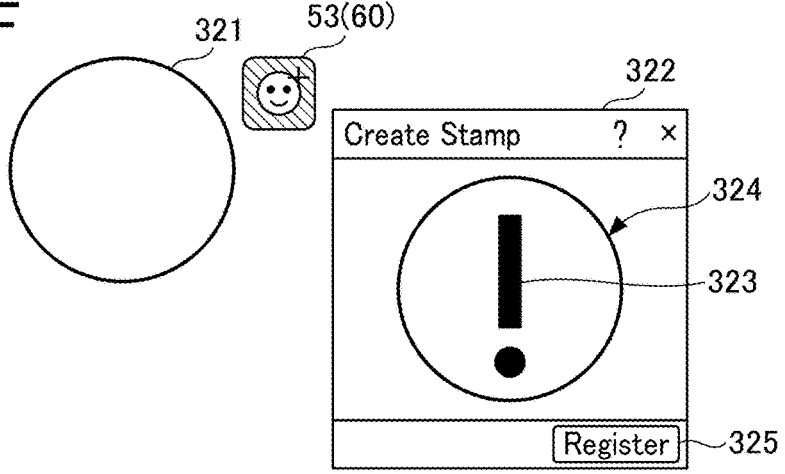

FIG. 10F illustrates a stamp 324 that is created. The user draws a desired character or figure (e.g., "!" 323 in FIG. 10F) within a circle in the stamp creation screen 322 (FIG. 11BB: step S33), and presses a "Register" button 325. In response to the pressing of the "Register" button 325, the stamp creation function unit 30 registers the stamp 324 (FIG. 11BB: step S34). The user can call up the created stamp by pressing a button or the like and causes the display to display the stamp at a desired position.

In another example, the character recognition unit 23 performs character recognition processing on the hand drafted input data drafted on the stamp creation screen 322. In still another example, the figure recognition unit 25 performs figure recognition processing on the hand drafted input data drafted on the stamp creation screen 322.

Figure 11B:
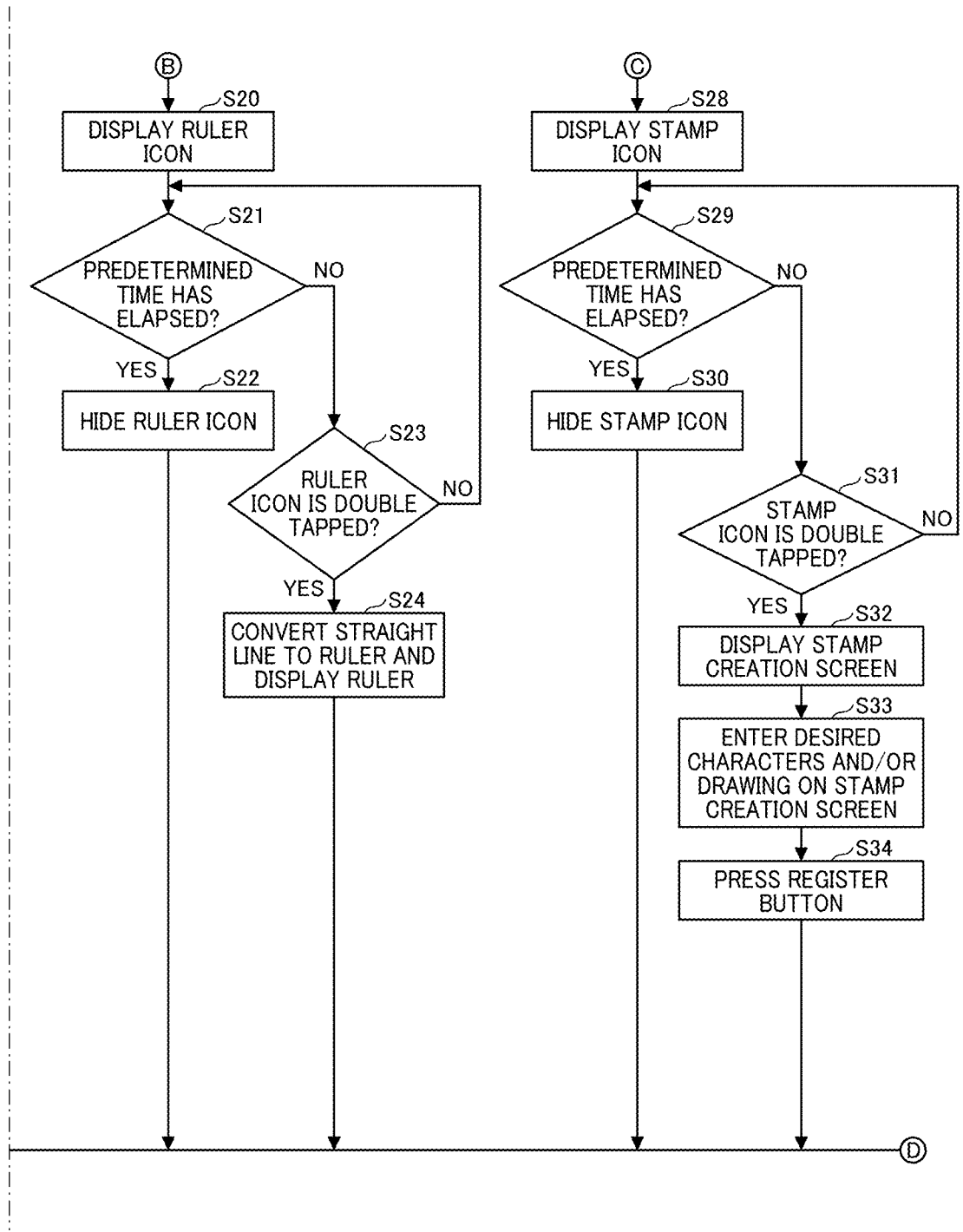

Operation:

FIG. 11A, FIG. 11BA, and FIG. 11BB (FIG. 11) are flowcharts illustrating an example of operation, performed by the display apparatus 2, of displaying the guidance 60 of a function corresponding to a shape of hand drafted input data drafted by a user.

When a user hand-drafts stroke data, the reception unit 21 receives the stroke data. The drawing data generation unit 22 connects coordinate points to display the hand drafted input data (step S1).

In a case that a figure recognition function is on, the figure recognition unit 25 converts the hand drafted input data into a figure. When the figure recognition unit 25 determines that a quadrangle is drafted by hand (Yes in step S2), the figure recognition unit 25 generates the quadrangle 301, and the display control unit 24 displays the quadrangle 301 (step S3). The display control unit 24 deletes the hand drafted input data after the conversion to the quadrangle 301.

When the quadrangle 301 is not drafted by hand (No in step S2), the figure recognition unit 25 determines whether a straight line is drafted by hand (step S17).

Based on the determination that a straight line is drafted by hand (Yes in step S17), the figure recognition unit 25 generates the straight line 311, and the display control unit 24 displays the straight line 311 (step S18). The display control unit 24 deletes the hand drafted input data after the conversion to the straight line 311.

When a straight line is not drafted by hand (No in step S17), the figure recognition unit 25 determines whether a circle is drafted by hand (step S25).

Based on the determination that a circle is drafted by hand (Yes in step S25), the figure recognition unit 25 generates the circle 321, and the display control unit 24 displays the circle 321 (step S26). The display control unit 24 deletes the hand drafted input data after the conversion to the circle 321. In a case that a circle is not drafted by hand (No in step S25), the operation of FIG. 11 ends.

Next, the display control unit 24 determines whether a setting for displaying related function icons is set to ON (step S4).

Based on the determination that the setting for displaying related function icons is set to ON (Yes in step S4), the display control unit 24 determines whether the hand drafted input data is converted into the quadrangle 301 (step S5).

Based on the determination that the hand drafted input data is converted into the quadrangle 301 (Yes in step S5), the display control unit 24 acquires the sticky note function and the table function, which are associated with the quadrangle 301 in the related function information, e.g., Table 1, from the related function storage unit 391. Further, the display control unit 24 acquires an image of the sticky note icon 51 and an image of the table icon 50 from the icon information, e.g., Table 2, stored in the icon storage unit 392. The display control unit 24 displays the sticky note icon 51 and the table icon 50 to the upper right of the quadrangle 301, for example (step S6).

The display control unit 24 determines whether the certain time period (e.g., several seconds) has elapsed since the display of the sticky note icon 51 and the table icon 50 (step S7). This process is performed to allow the display control unit 24 to erase the sticky note icon 51 and the table icon 50.

When the certain time period has elapsed (Yes in step S7), the display control unit 24 erases the sticky note icon 51 and the table icon 50 (step S8).

Until the certain time period has elapsed (No in step S7), the operation receiving unit 27 determines whether the sticky note icon 51 is pressed based on coordinates on the display touched by the input device 291, the coordinates being received by the reception unit 21 (step S9).

Based on the determination that the sticky note icon 51 is pressed (Yes in step S9), the sticky note function unit 29 converts the quadrangle 301 into the sticky note 302, and the display control unit 24 displays the sticky note 302 (step S10).

Based on the determination that the sticky note icon 51 is not pressed (No in step S9), the operation receiving unit 27 determines whether the table icon 50 is pressed based on coordinates on the display touched by the input device 291, the coordinates being received by the reception unit 21 (step S11).

When the operation receiving unit determines that the table icon 50 is pressed (Yes in step S11), the table function unit 28 creates the dialog box 303 for creating a table, and the display control unit 24 displays the dialog box 303 (step S12).

The display control unit 24 determines whether the certain time period (e.g., several seconds) has elapsed since the display of the dialog box 303 for creating a table (step S13). This process is performed to allow the display control unit 24 to erase the dialog box 303 for creating a table.

When the certain time period has elapsed (Yes in step S13), the display control unit 24 erases the dialog box 303 for creating a table (step S14).

Until the certain time period has elapsed (No in step S13), the operation receiving unit 27 determines whether the rows and columns of a table are selected and confirmed based on coordinates on the display touched by the input device 291, the coordinates being received by the reception unit 21 (step S15).

When the row and column of the table are selected and confirmed (Yes in step S15), the table function unit 28 converts the quadrangle 301 into the table 304, and the display control unit 24 displays the table 304 (step S16).

Referring again to step S5, when the hand drafted input data is not converted into the quadrangle 301 (No in step S5), the display control unit 24 determines whether the hand drafted input data is converted into the straight line 311 (S19).

Based on the determination that the hand drafted input data is converted into the straight line 311 (Yes in step S19), the display control unit 24 acquires the ruler function, which is associated with the straight line in the related function information, e.g., Table 1, from the related function storage unit 391. Further, the display control unit 24 acquires an image of the ruler icon 52 from the icon information, e.g., Table 2, stored in the icon storage unit 392. The display control unit 24 displays the ruler icon 52 to the upper right of the straight line 311, for example (step S20).

The display control unit 24 determines whether the certain time period (e.g., several seconds) has elapsed since the display of the ruler icon 52 (step S21). This process is performed to allow the display control unit 24 to erase the ruler icon 52.

When the certain time period has elapsed (Yes in step S21), the display control unit 24 erases the ruler icon 52 (step S22).

Until the certain time period has elapsed (No in step S21), the operation receiving unit 27 determines whether the ruler icon 52 is pressed based on coordinates on the display touched by the input device 291, the coordinates being received by the reception unit 21 (step S23).

Based on the determination that the ruler icon 52 is pressed (Yes in step S23), the ruler function unit 31 converts the straight line 311 into the ruler 312, and the display control unit 24 displays the ruler 312 (step S24).

When the hand drafted input data is not converted into the straight line 311 (No in step S19), the display control unit 24 determines whether the hand drafted input data is converted into the circle 321 (S27).

Based on the determination that the hand drafted input data is converted into the circle (Yes in step S27), the display control unit 24 acquires the stamp creation function, which is associated with the circle in the related function information, e.g., Table 1, from the related function storage unit 391. Further, the display control unit 24 acquires an image of the stamp icon 53 from the icon information, e.g., Table 2, stored in the icon storage unit 392. The display control unit 24 displays the stamp icon 53 to the upper right of the circle 321, for example (step S28).

The display control unit 24 determines whether the certain time period (e.g., several seconds) has elapsed since the display of the stamp icon 53 (step S29). This process is performed to allow the display control unit 24 to erase the stamp icon 53.

When the certain time period has elapsed (Yes in step S29), the display control unit 24 erases the stamp icon 53 (step S30).

Until the certain time period has elapsed (No in step S29), the operation receiving unit 27 determines whether the stamp icon 53 is pressed based on coordinates on the display touched by the input device 291, the coordinates being received by the reception unit 21 (step S31).

Based on the determination that the stamp icon 53 is pressed (Yes in step S31), the display control unit 24 displays the stamp creation screen 322 (step S32).

When a user drafts desired hand drafted input data on the stamp creation screen 322, the reception unit 21 receives the hand drafted input data (step S33).

The stamp creation function unit 30 creates a stamp based on the hand drafted input data received by the reception unit 21 and pressing of the "Register" button 325 received by the operation receiving unit 27 (step S34).

Figure 12:
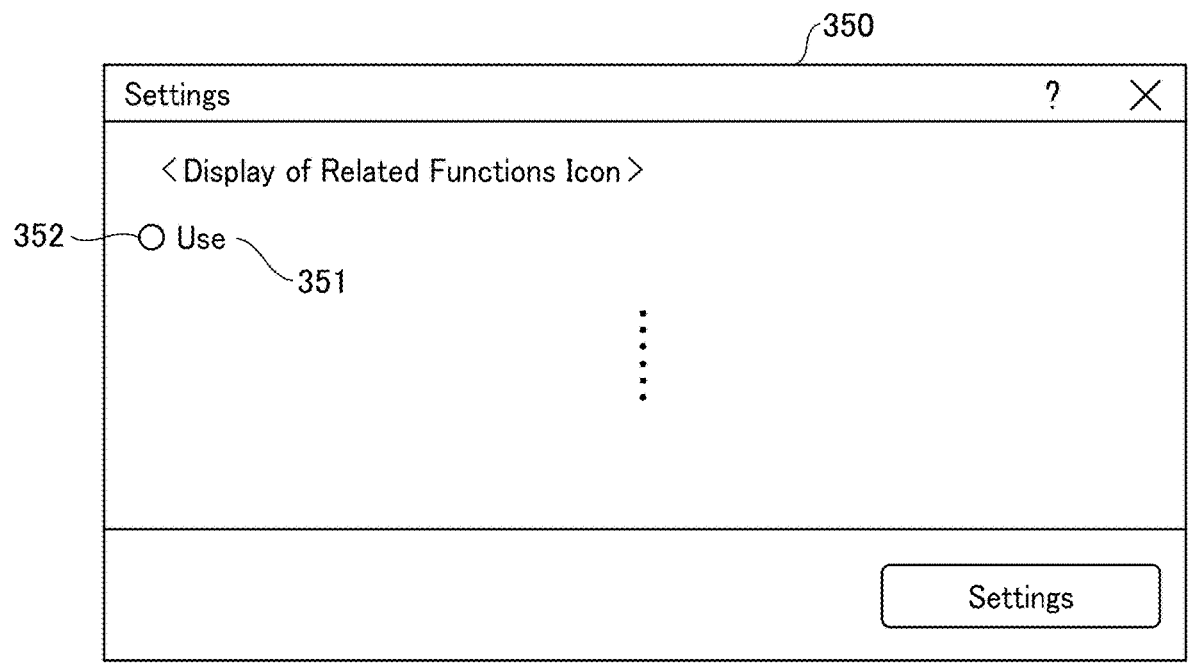
FIG. 12 is a diagram illustrating an example of a setting screen that receives configuration of settings as to whether to display related function icons, according to an embodiment of the present disclosure.

Setting for Displaying Related Function Icons:

As illustrated in FIG. 12, the display apparatus 2 allows a user to configure settings as to whether to display the related function icons. FIG. 12 illustrates an example of a setting screen 350 that receives configuration of settings as to whether to display the related function icons. The user presses a predetermined button, for example, to control the display apparatus 2 to display the setting screen 350.

The setting screen 350 displays a "Use" message 351 and a radio button 352 for a function of displaying the related function icons.

The operation receiving unit 27 determines whether the radio button 352 is pressed based on coordinates on the display touched by the input device 291, the coordinates being received by the reception unit 21. When the operation receiving unit 27 determines that the radio button is pressed, the display control unit 24 stores information indicating that the setting for displaying the related function icons is ON.

As described, the display apparatus 2 allows the user to set the setting for displaying the related function icons to ON or OFF. With this configuration, when a user who operates the display apparatus 2 is familiar with functions of the display apparatus, such a user may configure the settings so that the related function icons are not displayed. This eliminates or minimizes the user's feeling of being annoyed.

As described above, when a user draws a predetermined shape by hand as hand drafted input data (more specifically, when the display apparatus 2 converts the hand drafted input data into a certain figure with the figure conversion function), the display apparatus 2 according to the present embodiment displays the guidance 60 of functions relating to the shape of the hand drafted input data. This allows the user to use a desired function, even in a case that there is a function that the user is unaware of. Further, when a user uses a new function, the time and efforts are saved for the user to search or check a manual for the new function.

Second Embodiment

Other examples of the configuration of the display apparatus 2 according to the second embodiment are described below.

First Example of Another Configuration of Display Apparatus

Although the description given above is of an example in which the display apparatus 2 has a large touch panel according to the embodiment, such display apparatus 2 is merely one example.

Figure 13:
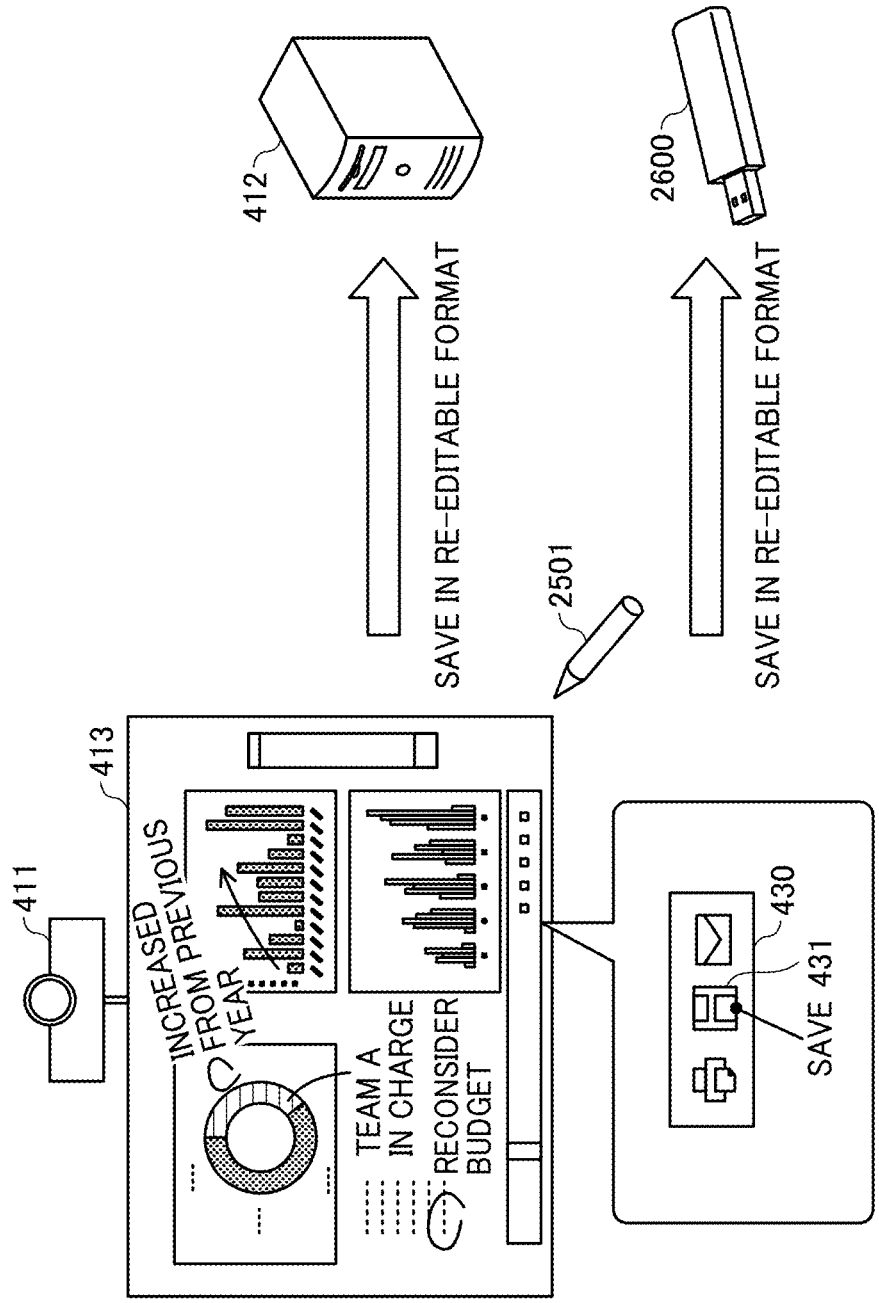
FIG. 13 is a diagram illustrating another example of a configuration of a display apparatus, according to an embodiment of the present disclosure.

FIG. 13 is a diagram illustrating an example of a configuration of the display apparatus 2, according to the second embodiment. According to the present embodiment, a display system is provided that includes a projector 411, a whiteboard 413, and a server 412, which are communicable via a network. In FIG. 13, the projector 411 is installed on the upper face of the whiteboard 413, which is a general whiteboard (standard whiteboard).

The projector 411 mainly operates as the display apparatus 2 described above. In other words, the projector 411 is a general-purpose projector, but installed with software that causes the projector 411 to function as each function of the display apparatus 2 as illustrated in FIG. 6. The server 412 or an external memory, such as a USB memory 2600, may serve as a function corresponding to the storage function of the display apparatus 2. The "standard whiteboard" (the whiteboard 413) is not a flat panel display integral with a touch panel, but is a whiteboard to which a user directly writes or draws with a marker. Note that the whiteboard may be a blackboard, and may be simply a plane having an area large enough to project an image.

The projector 411 employs an ultra short-throw optical system and projects an image (video) with reduced distortion from a distance of about 10 cm to the whiteboard 413. This video may be transmitted from a PC connected wirelessly or by wire, or may be stored in the projector 411.

The user writes or draws on the whiteboard 413 using an electronic pen 2501, which is dedicated to the whiteboard. The electronic pen 2501 includes a light-emitting element, for example, at a tip portion thereof. When a user presses the electronic pen 2501 against the whiteboard 413 for writing or drawing, a switch is turned on, and the light-emitting portion emits light. The wavelength of light of the light-emitting element is near-infrared or infrared that is invisible to a user. The projector 411 includes a camera. The projector 411 captures, with the camera, an image of the light-emitting element, analyzes the image, and determines the direction of the electronic pen 2501. Thus, the reception unit 21 and the operation receiving unit 27 (illustrated in FIG. 6), implemented by the camera, receives the light as the signal indicating that the electronic pen 2501 is pressed against the whiteboard 413. Further, the electronic pen 2501 emits a sound wave in addition to the light, and the projector 411 calculates a distance based on an arrival time of the sound wave. The projector 411 identifies the position of the electronic pen 2501 based on the direction and the distance. Hand drafted input data is drawn (projected) at the position of the electronic pen 2501.

The projector 411 projects a menu 430. When the user presses a button of the menu 430 with the electronic pen 2501, the projector 411 identifies the pressed button based on the position of the electronic pen 2501 and the ON signal of the switch. For example, when a save button 431 is pressed, hand drafted input data (coordinate point sequence) input by the user is saved in the projector 411. The projector 411 stores information on a user hand drafted input in the server 412 that is determined in advance, or the USB memory 2600, for example. The information on a user hand drafted input data is stored for each page. Because being stored as coordinates instead of image data, the hand drafted input data is re-editable according to a user operation. In the present embodiment, an operation command can be called by hand drafted input data, and the menu 430 does not have to be displayed.

Third Embodiment

Second Example of Another Configuration of Display Apparatus

Figure 14:
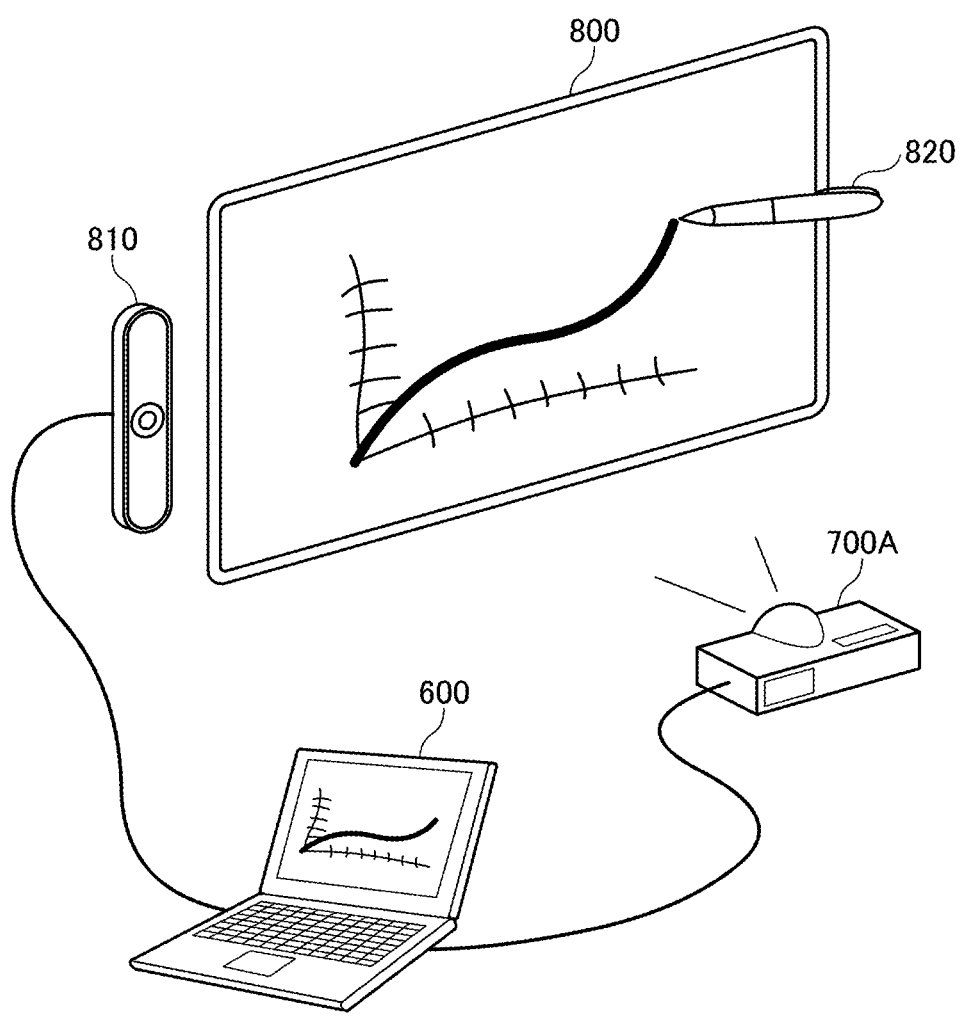
FIG. 14 is a diagram illustrating another example of a configuration of a display apparatus, according to an embodiment of the present disclosure.

FIG. 14 is a diagram illustrating an example of a configuration of the display apparatus 2, according to the third embodiment.

In the example illustrated FIG. 14, the display apparatus 2 includes a terminal device 600 (e.g., a PC), an image projection device 700A, and a pen motion detection device 810.

The terminal device 600 is coupled to the image projection device 700A and the pen motion detection device 810 by wire. The image projection device 700A projects image data input from the terminal device 600 onto a screen 800.

The pen motion detection device 810 communicates with an electronic pen 820 to detect a motion of the electronic pen 820 in the vicinity of the screen 800. More specifically, the pen motion detection device 810 detects coordinate information indicating a position pointed by the electronic pen 820 on the screen 800 and transmits the coordinate information to the terminal device 600. The detection of the coordinate information is performed is substantially the same manner as described with reference to FIG. 13. Functions corresponding to the reception unit 21 and the operation receiving unit 27 (illustrated in FIG. 6) of the display apparatus 2, is implemented by the electronic pen 820 and the pen motion detection device 810. Other functions corresponding to the functional units of the display apparatus 2 are implemented by the terminal device 600. In other words, the terminal device 600 is a general-purpose computer, and installed with software that causes the terminal device 600 to function as the function units, except for the reception unit 21 and the operation receiving unit 27 of the display apparatus 2 as illustrated in FIG. 6. In addition, a function corresponding to the display control unit 24 is implemented by the terminal device 600 and the image projection device 700A.

The terminal device 600 generates image data of hand drafted input data input by the electronic pen 820 based on the coordinate information received from the pen motion detection device 810. The terminal device 600 causes the image projection device 700A to project the hand drafted input data on the screen 800. The terminal device 600 generates data of a superimposed image in which an image based on the hand drafted input data input by the electronic pen 820 is superimposed on the background image projected by the image projection device 700A.

Fourth Embodiment

Third Example of Another Configuration of Display Apparatus

Figure 15:
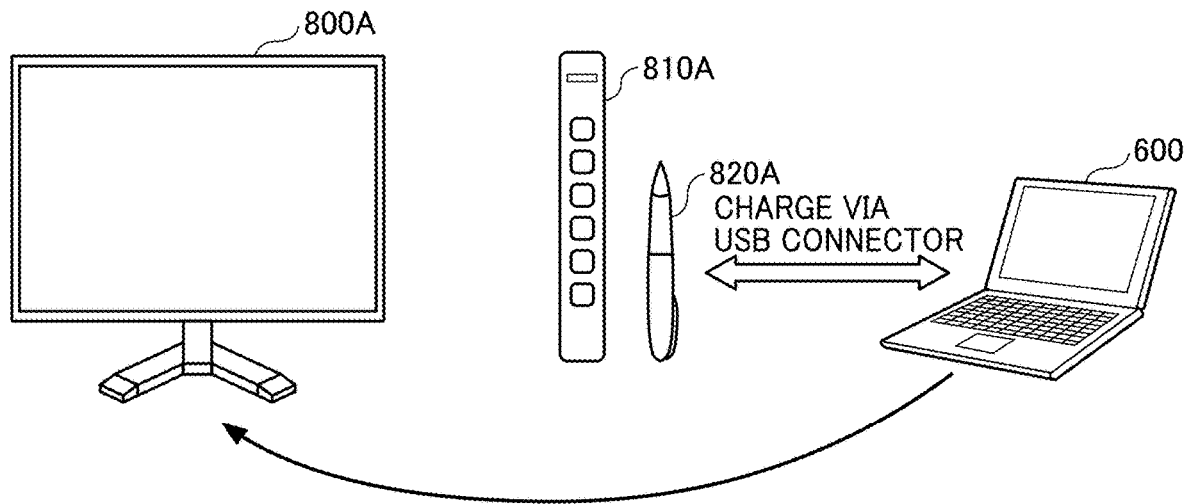
FIG. 15 is a diagram illustrating another example of a configuration of a display apparatus, according to an embodiment of the present disclosure.

FIG. 15 is a diagram illustrating an example of a configuration of the display apparatus 2, according to the fourth embodiment.

In the example of FIG. 15, the display apparatus 2 includes the terminal device 600, a display 800A, and a pen motion detection device 810A.

The pen motion detection device 810A, which is disposed in the vicinity of the display 800A, detects coordinate information indicating a position pointed by an electronic pen 820A on the display 800A and transmits the coordinate information to the terminal device 600. The detection of the coordinate information is performed is substantially the same manner as described with reference to FIG. 13. In the example of FIG. 15, the electronic pen 820A may be charged from the terminal device 600 via a USB connector. A function corresponding to the reception unit 21 and the operation receiving unit 27 (illustrated in FIG. 6) of the display apparatus 2, is implemented by the electronic pen 820A and the pen motion detection device 810A. Other functions corresponding to the functional units other than the reception unit 21 and the operation receiving unit 27 (illustrated in FIG. 6) of the display apparatus 2 are implemented by the terminal device 600. In other words, the terminal device 600 is a general-purpose computer, and installed with software that causes the terminal device 600 to function as the function units, except for the reception unit 21 and the operation receiving unit 27, of the display apparatus 2 as illustrated in FIG. 6. In addition, a function corresponding to the display control unit 24 is implemented by the terminal device 600 and the display 800A.

Based on the coordinate information received from the pen motion detection device 810, the terminal device 600 generates image data of hand drafted input data input by the electronic pen 820A. The terminal device 600 causes the display 800A to display an image based on the hand drafted input data.

Fifth Embodiment

Fourth Example of Another Configuration of Display Apparatus

Figure 16:
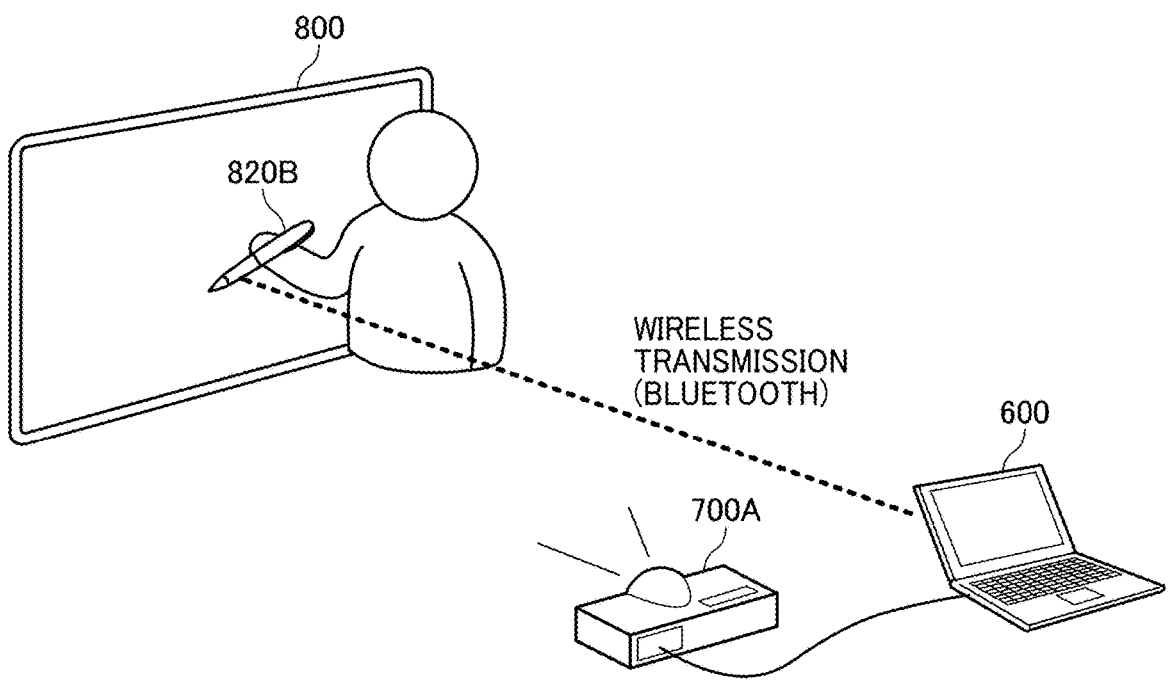
FIG. 16 is a diagram illustrating another example of a configuration of a display apparatus, according to an embodiment of the present disclosure.

FIG. 16 is a diagram illustrating an example of a configuration of the display apparatus 2, according to the fifth embodiment. In the example of FIG. 16, the display apparatus 2 includes the terminal device 600 and an image projection device 700A.

The terminal device 600 communicates with an electronic pen 820B through by wireless communication such as Bluetooth®, to receive coordinate information indicating a position pointed by the electronic pen 820B on the screen 800. The electronic pen 820B may read minute position information on the screen 800, or receive the coordinate information from the screen 800.

Based on the received coordinate information, the terminal device 600 generates image data (hand drafted data) of hand drafted input by the electronic pen 820B. The terminal device 600 causes the image projection device 700A to project an image based on the hand drafted data.

The terminal device 600 generates data of a superimposed image in which an image based on the hand drafted input data input by the electronic pen 820B is superimposed on the background image projected by the image projection device 700A. A function corresponding to the reception unit 21 and the operation receiving unit 27 (illustrated in FIG. 4) of the display apparatus 2, is implemented by the electronic pen 820B and the terminal device 600. Other functions corresponding to the functional units other than the reception unit 21 and the operation receiving unit 27 (illustrated in FIG. 6) of the display apparatus 2 are implemented by the terminal device 600. In other words, the terminal device 600 is a general-purpose computer, and installed with software that causes the terminal device 600 to function as the function units of the display apparatus 2 as illustrated in FIG. 6. In addition, a function corresponding to the display control unit 24 is implemented by the terminal device 600 and the image projection device 700A.

The embodiments described above are applied to various system configurations.

Variations:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The description given above is of an example in which hand drafted input data is input in the embodiments. In another example, the character recognition unit 23 performs character recognition on the hand drafted input data. For example, the character recognition unit 23 recognizes hand drafted input data input in the sticky note, hand drafted input data input in a cell of the table, or hand drafted input data input on the stamp creation screen.

The description given above is of an example of the display apparatus 2 used as an electronic whiteboard in the embodiments. In another example, the display apparatus 2 may be any device that displays an image, such as a digital signage. In still another example, instead of the display apparatus 2, a projector may perform displaying. In this case the display apparatus 2 may detect the coordinates of the tip of the pen using ultrasonic waves, instead of detecting the coordinates of the tip of the pen using the touch panel as described in the above embodiments. The pen emits an ultrasonic wave in addition to the light, and the display apparatus 2 calculates a distance based on an arrival time of the sound wave. The position of the pen is identified based on the direction and the distance. The projector draws (projects) the trajectory of the pen as a stroke.

In alternative to the electronic whiteboard of the embodiments described above, the present disclosure is applicable to any information processing apparatus with a touch panel.

An apparatus having capabilities similar to that of an electronic whiteboard is also called an electronic information board or an interactive board. Examples of the information processing apparatus with a touch panel include, but not limited to, a projector (PJ), a data output device such as a digital signage, a heads-up display (HUD), an industrial machine, an imaging device such as a digital camera, a sound collecting device, a medical device, a networked home appliance, a laptop computer, a mobile phone, a smartphone, a tablet terminal, a game console, a personal digital assistant (PDA), a wearable PC, and a desktop PC.

The functional configuration of the display apparatus 2 are divided into the functional blocks as illustrated in FIG. 6, for example, based on main function of the display apparatus, in order to facilitate understanding the processes performed by the display apparatus. No limitation is intended by how the processes are divided or by the name of the processes. The processes implemented by the display apparatus 2 may be divided to a larger number of processes depending on the contents of processes. Further, one process may be divided to include the larger number of processes.

Although characteristic functions of the above-described embodiments are provided by the display apparatus 2 alone in the description above, a server may provide at least a portion of the functions of the display apparatus 2. In this case, the display apparatus 2 and the server communicate with each other through a network. The display apparatus 2 displays hand drafted input data and transmits the hand drafted input data to the server, and the server provides a character recognition function and a table function.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The reception unit 21 is an example of a first receiving means. The storage unit 39 is an example of storing means. The display control unit 24 is an example of display control means. The figure recognition unit 25 is an example figure recognition means. The operation receiving unit 27 is an example of second receiving means. At least one of the table function unit 28, the sticky note function unit 29, the stamp creation function unit 30, and the ruler function unit 31 is an example of control means.

In the related art, there is a drawback that a display component corresponding to hand drafted data is not displayed. The display component refers to an icon or the like, that, when selected, causes a processor to execute a predetermined process. The definition of the display component is described in the "Detailed Description" section.

For example, the information apparatus in the "Related Art" section displays a command menu in response to a user's operation of surrounding handwritten characters with stroke data. However, a user who is not aware that functions are provided does not know that the command menu are displayed by surrounding handwritten characters with stroke data. Accordingly, the user does not even cause the information processing apparatus to display the command menu.

According to one or more embodiments of the present disclosure, a display apparatus is provided that displays a display component corresponding to hand drafted input data.

The invention claimed is:

1. A display apparatus, comprising:
a memory that stores one or more display components; and
circuitry configured to:
receive an input of hand drafted input data;
display at least one display component of the one or more display components, the at least one display component corresponding to a shape of the hand drafted input data whose input is received;
display a setting screen that receives configuration of settings as to whether to display the one or more display components, and
in a case that the circuitry receives a setting to display the one or more display components on the setting screen, display the at least one display component corresponding to the hand drafted input data.

2. The display apparatus of claim 1, wherein the circuitry is further configured to
receive an operation on the at least one display component, and
execute processing corresponding to the at least one display component on which the operation is received.

3. The display apparatus of claim 1, wherein the circuitry is further configured to
convert the hand drafted input data whose input is received into a figure, and
display the at least one display component corresponding to the figure.

4. The display apparatus of claim 3, wherein in a case the figure converted from the hand drafted input data is a quadrangle, the circuitry displays at least one of a sticky note icon and a table icon as the at least one display component corresponding to the quadrangle.

5. The display apparatus of claim 3, wherein in a case the figure converted from the hand drafted input data is a straight line, the circuitry displays an icon representing a ruler function as the at least one display component corresponding to the straight line.

6. The display apparatus of claim 3, wherein in a case the figure converted from the hand drafted input data is a circle, the circuitry displays an icon representing a stamp creation function as the at least one display component corresponding to the circle.

7. The display apparatus of claim 1, wherein the circuitry is further configured to erase the at least one display component in a case that no operation is performed on the at least one display component before a lapse of a certain time period since the at least one display component is displayed.

8. The display apparatus of claim 1, wherein the circuitry is further configured to:
   convert the shape of the hand drafted input data into a figure;
   receive a second input selecting an available function; and
   perform the available function.

9. The display apparatus of claim 8, wherein the available function converts the figure into a table.

10. The display apparatus of claim 8, wherein the available function converts the figure into a sticky note.

11. The display apparatus of claim 8, wherein the available function converts the figure into a ruler.

12. The display apparatus of claim 8, wherein the available function converts the figure into a stamp.

13. A display method, comprising:
   receiving an input of hand drafted input data;
   acquiring at least one display component corresponding a shape of the hand drafted input data from a memory that stores one or more display components;
   displaying the at least one display component;
   displaying a setting screen that receives configuration of settings as to whether to display the one or more display components, and
   in a case of receiving a setting to display the one or more display components on the setting screen, displaying the at least one display component corresponding to the hand drafted input data.

14. A non-transitory computer-executable medium storing a program storing instructions which, when executed by a processor of a display apparatus, causes the display apparatus to perform a method comprising:
   receiving an input of hand drafted input data;
   acquiring at least one display component corresponding a shape of the hand drafted input data from a memory that stores one or more display components;
   displaying the at least one display component; and
   displaying a setting screen that receives configuration of settings as to whether to display the one or more display components, and
   in a case of receiving a setting to display the one or more display components on the setting screen, displaying the at least one display component corresponding to the hand drafted input data.

* * * * *